US010713311B2

(12) United States Patent
Wang

(10) Patent No.: US 10,713,311 B2
(45) Date of Patent: Jul. 14, 2020

(54) AUDIENCE ON NETWORKED DEVICES

(71) Applicant: ADELPHIC LLC, Irvine, CA (US)

(72) Inventor: Changfeng Charles Wang, Lexington, MA (US)

(73) Assignee: ADELPHIC LLC, Irvine, CA (US)

( * ) Notice: Subject to any disclaimer, the term of this patent is extended or adjusted under 35 U.S.C. 154(b) by 361 days.

(21) Appl. No.: 14/832,930

(22) Filed: Aug. 21, 2015

(65) Prior Publication Data

US 2016/0055244 A1 Feb. 25, 2016

Related U.S. Application Data

(60) Provisional application No. 62/040,744, filed on Aug. 22, 2014.

(51) Int. Cl.
| | |
|---|---|
| G06F 16/9535 | (2019.01) |
| G06F 16/335 | (2019.01) |
| G06F 16/35 | (2019.01) |
| G06F 16/9035 | (2019.01) |
| G06F 16/25 | (2019.01) |

(52) U.S. Cl.
CPC ........ *G06F 16/9535* (2019.01); *G06F 16/254* (2019.01); *G06F 16/337* (2019.01); *G06F 16/9035* (2019.01)

(58) Field of Classification Search
USPC ....................................................... 707/770
See application file for complete search history.

(56) References Cited

U.S. PATENT DOCUMENTS

| | | | |
|---|---|---|---|
| 2009/0300066 A1* | 12/2009 | Guo | H04L 29/1216 |
| 2010/0076850 A1 | 3/2010 | Parkeh et al. | |
| 2011/0040586 A1* | 2/2011 | Murray | G06Q 30/02 |
| | | | 705/14.49 |
| 2011/0264519 A1 | 10/2011 | Chan et al. | |
| 2012/0166285 A1 | 6/2012 | Shapiro et al. | |
| 2013/0124315 A1* | 5/2013 | Doughty | G06Q 30/0269 |
| | | | 705/14.53 |
| 2013/0304658 A1 | 11/2013 | Zhou et al. | |
| 2014/0089400 A1 | 3/2014 | Yan et al. | |
| 2014/0337096 A1* | 11/2014 | Bilenko | G06Q 30/0202 |
| | | | 705/7.31 |

OTHER PUBLICATIONS

International Search Report and Written Opinion, PCT/US15/46406, dated Dec. 22, 2015, 11 pages.

* cited by examiner

*Primary Examiner* — James Trujillo
*Assistant Examiner* — John J Morris
(74) *Attorney, Agent, or Firm* — Gates & Cooper LLP

(57) ABSTRACT

Methods, systems, and apparatus, including computer programs encoded on computer storage media, for an audience of network devices. One of the methods includes receiving information from a source, the information associated with a device identifier. The method includes determining, based on the device identifier, a unique user identifier, wherein the unique user identifier identifies a user independent of network, media, and location. The method includes identifying at least one user attribute based on the received information. The method includes associating the user attribute with the unique user identifier. The method also includes storing the user attribute in a repository. The repository stores a plurality of other user attributes associated with the unique user identifier, the other stored user attributes being received from a plurality of different sources.

53 Claims, 19 Drawing Sheets

AUDIENCE ON NETWORKED DEVICES

CLAIM OF PRIORITY

This application claims priority to U.S. Provisional Patent Application Ser. No. 62/040,744, filed on Aug. 22, 2014 and entitled "Audience on Networked Devices," the entire contents of which are hereby incorporated by reference.

BACKGROUND

Wide adoption of new mass market networked devices, such as mobile phones, tablets, along with laptop, desk top computers, connected TV, is dramatically changing how users interact with each other, entertain, shop, and consume media. Indeed, mobile Internet is surpassing fixed lines for media consumption and it is common for the same users to own multiple devices and use the devices for different purposes at different times. This provides excellent opportunities for advertisers to reach and engage audiences on mobile devices in conjunction with other devices and media channels.

SUMMARY

Information about users can be gathered from a wide variety of different sources. Each source may have different information about the user or the device the user uses, depending on the source. For example, a user may be associated with a particular cookie or user id on one system and associated with a MAC address or other device identifier on another system, and is associated with web usage information, and the other mobile app usage information. A user may have one identifier when using a tablet and another identifier when using a smartphone. A system can gather user information from a wide variety of different sources. The information from different sources can be analyzed to determine a unique individual associated with the information. For example, the system can determine that the same individual is using a particular smart phone at one time, a laptop computer at another time, and a tablet at a third time. Or that the user has one identifier one a social networking site and another identifier on a retail site or a different corporate internal transaction system.

The system can analyze and collate the information provided from the different data sources. User attributes can be extracted or inferred from the information, creating a more complete profile of the individual user. This information can be used to better target and retarget advertisements across different networked devices and media channels. Better targeted advertisements can afford advertisers better ad performance and return on advertising money, earn publishers a greater income, and improve the user experience.

The system also can enable the creation of micro-segments of users. That is a selection of users who fit into a specific profile for a large variety of goals.

In general, one innovative aspect of the subject matter described in this specification can be embodied in methods that include the actions of receiving information from a source, the information associated with a device identifier. The methods include the actions of determining, based on the device identifier or a set of signatures associated with a device and usage pattern, a unique user identifier, wherein the unique user identifier identifies a user independent of network, media, and location. The methods include the actions of identifying at least one user attribute based on the received information. The methods include the actions of associating the user attribute with the unique user identifier. The methods also include the actions of storing the user attribute in a repository. The methods also include the action of retrieving the information from different devices for real-time usage and offline analytical processing. The repository stores a plurality of other user attributes associated with the unique user identifier, the other stored user attributes being received from a plurality of different sources. Another aspect of the invention described in this specification includes methods of targeting and retargeting users with predictable outcome, and packaging audience for different advertiser groups. The methods include the action of scoring the users based on a plural of user attributes. The method also includes the action of targeting the user from the same device or retargeting the user from a different device based on the score. The method also includes the action of packaging the user based on the score for particular type of advertisers.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Identifying at least one user attribute based on the information may include inferring the user attribute according to a model. The methods may include the actions of linking the unique user identifier with a plurality of signatures, each signature specific to a device or media channel. The signatures may be selected from the group consisting of IP addresses, location identifiers, zip code, street segment, latitude and longitude pairs, media identifiers, media category identifiers, device clock skew, device clock offset, device connection and response time. Storing the user attribute may include obtaining a plurality of device identifiers associated with the unique user identifier, generating a hash value based on the plurality of device identifiers, and storing the user attribute in a location identified by the hash value. The methods may include the actions of determining that a device identifier contains user identifiable information. The methods may include the actions of generating an anonymous device identifier using a one-way hash of the device identifier. The device identifier may be selected from the group consisting of IDFA and UDID devices, and Android Advertising Id. The user attribute may include at least one of usage scores, purchase history, education level, income, interest scores, advertising interactions, media consumption interactions and social interaction data. The source may be selected from the group consisting of a mobile phone, a tablet computing device, a personal computer, a connected TV, online and offline transactions, and an internet protocol television. The methods may include the actions of receiving additional information about the user from a plurality of sources, each source associated with a device identifier and associating each of the device identifiers with the unique user identifier. The methods may include the actions of receiving a request for user attributes, the request including a device identifier, identifying a unique user identifier based on the device identifier, and providing user data associated with the unique user identifier. The methods may include the actions of receiving a request for user attributes, the request including a signature, identifying a unique user identifier based on the signature, and providing user attributes associated with the unique user identifier. The computer-implemented method of claim 1, wherein the information from different devices is used for real-time use and offline analytical processing. The methods may include the actions of targeting a group of users across different device identifiers and media channels comprising receiving a request that contains a linked device ID or user signature, receiving a rule involving targeted user attributes, retrieving the stored user attributes using the device ID or user signature, and identifying the targeted user by applying the rule to the user attributes. The methods may include the actions of identifying a plurality of sets of users, each set of users targeted toward different advertiser groups. The methods may include the actions of generating a score for the user based on the user attributes of the user. The methods may include the actions of targeting the user from the same device or retargeting the user from a different device based on the score. The methods may include the actions of grouping the user with other users for a type of advertiser based on the score.

The foregoing summary is illustrative only and is not intended to be in any way limiting. In addition to the illustrative aspects, embodiments, and features described above, further aspects, embodiments, and features will become apparent by reference to the following drawings and the detailed description.

These and other aspects, features, and various combinations may be expressed as methods, apparatus, systems, means for performing functions, program products, etc.

Other features and advantages will be apparent from the description and the claims.

DESCRIPTION OF DRAWINGS

Like reference symbols in the various drawings indicate like elements.

DETAILED DESCRIPTION

Figure 1:
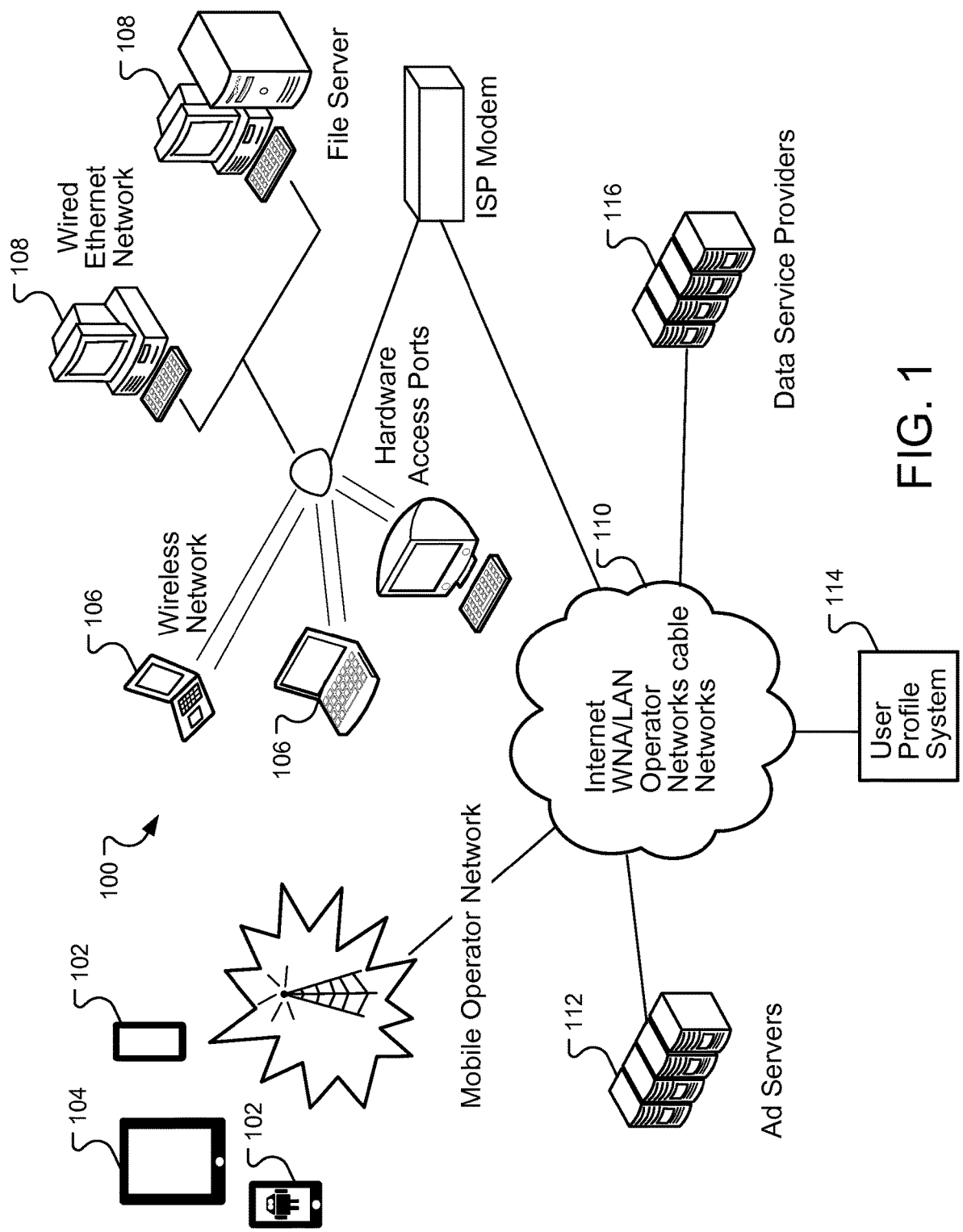
FIG. 1 is a block diagram of an example of an environment for user profile processing.

Effective advertising requires knowing the user behind the devices in terms of data attributes that are relevant to ad performance for driving media buying and selling decisions. In particular, a recent trend in addressable digital advertising is automation of the ad transaction. The availability of user data is a cornerstone for programmatic buying and selling decisions.

A major challenge gathering and accessing user data is that, in general, user data resides in fragmented silos of devices and/or channels. For example, there is a rich set of user data from online and offline channels, but such data is not easily available for the buying of mobile ads. Conversely, increasing user activities from mobile channels also contain a rich set of data (such as location, interests, etc.) that are not available from other channels. It is an unsolved problem of how to build unified user profiles across devices and channels by integrating the data from all sources together and leveraging all the information to improve effectiveness in advertising and marketing, and doing so in such a way that privacy is preserved at the same time.

The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In order to ensure accurate user information while preserving privacy, cross device and channel user profiles for across networked devices, such as mobile phones, desktop and laptop computers, can be used. The user profiles can be used for targeting, re-targeting, decision optimization, user interactions, and content delivery.

In some implementation, each user can be identified by a device and media agnostic identifier or keys, which can then be linked to other identifiers using deterministic or probabilistic rules described in UNIQUELY IDENTIFYING A NETWORK-CONNECTED ENTITY, U.S. Pat. No. 8,438,184 issued May 7, 2013 and incorporated herein by reference. User data from different sources can be linked to the unique user by user identifier keys and/or signatures specific to particular devices and media channels. The user data may also be made available to other channels through the unique identifiers. Examples of user data include, for example, the content types the user might be interested in, intentions scores (scores representative of the likelihood that a user plans to or will buy a certain product), physical locations the user visited or is visiting, online content or purchases the user is interested in, demographics, and other data. Specific data attributes values can be created from observed data, inferred data, or direct data integration from third party sources. Irrespective of the sources, a common meta-model can be used to describe the user keys as well as other data dimensions, making it possible to use the same implementation for all types of data without having to change the code when new data or data types are added to the system. Each data dimensions is described by a taxonomy and ontology that may be customized for specific certain industry domain, definitions, source and nature of data, pricing, and other properties.

Data may be sourced from any channel (such as Web and applications media usage tracking from user devices (mobile phone, tablet, laptop), advertising requests, re-targeting tracking, third party data providers etc.) and the data may be provided to the system using real-time transaction, streaming, or batch processing. The data may be provided using different data transport protocols. The data may be provided to a user integration subsystem, which maintains the user identifier linkages to real-time user identifier keys and signatures, as well as integrates the data attributes to the keys. New data dimensions can be added by using existing keys and/or creating new keys, and can be updated using one or more of the keys that are linked to the unique identifier. In real-time, user data can be accessed using a device specific identifier or through a combinations of other keys and group membership of the user can be accessed using the dimensional data.

One or more data records containing user attributes can be retrieved using any of the keys or signatures associated with the user. To speed up access to data, data is stored in different storage and memory structures, including local memory, distributed memory, and distributed databases. In some implementations, some of the data may be stored in a client cache or database on the user device.

FIG. 1 is a block diagram of an example of an environment 100 for user profile processing. In some embodiments, user devices (for example, mobile phones 102, tablets 104, laptop computers 106, and desktop computers 108) can be connected to the user profiling system 114 through the Internet 110, either through a publisher content server (not shown), an ad server 112, or the user data processing system directly. While the Internet 110 is presented in the figure as the network for exchanging data and information, one or more other types of networking techniques, architecture, etc. may be employed separately or in concert with the Internet 110 for such functionality and may use various types of equipment, protocols, technology, etc.

Each of these devices may serve as a source of user data or may be a consumer of the user data services. Different connection protocols maybe involved. In a typical scenario, end user devices use the hypertext transport protocol (HTTP) through the Internet 110, either through operator networks or ISP wired or wireless connections. In addition, a set top box might be used, in which case the user datagram protocol (UDP) may be used. The user device may connect to the system indirectly through publisher ad servers, advertiser exchanges, publisher content servers for real-time connections communications, etc. and user data may also come from third party data providers by way of real-time connection through http protocols, batch file upload, streaming, etc.

In FIG. 1, an ad server 112 serves as an example of a user data consumer. The ad server 112 may be a buy side server to help demand side platform, advertising, exchanges, or a publisher ad server to enrich her inventory value by auditing user data dimensions. It is noted that the ad server 112 is only used by way of demonstration. To those who are skilled in the art, it should be obvious that other applications that require user data may also be set up in a similar fashion.

Figure 2A:
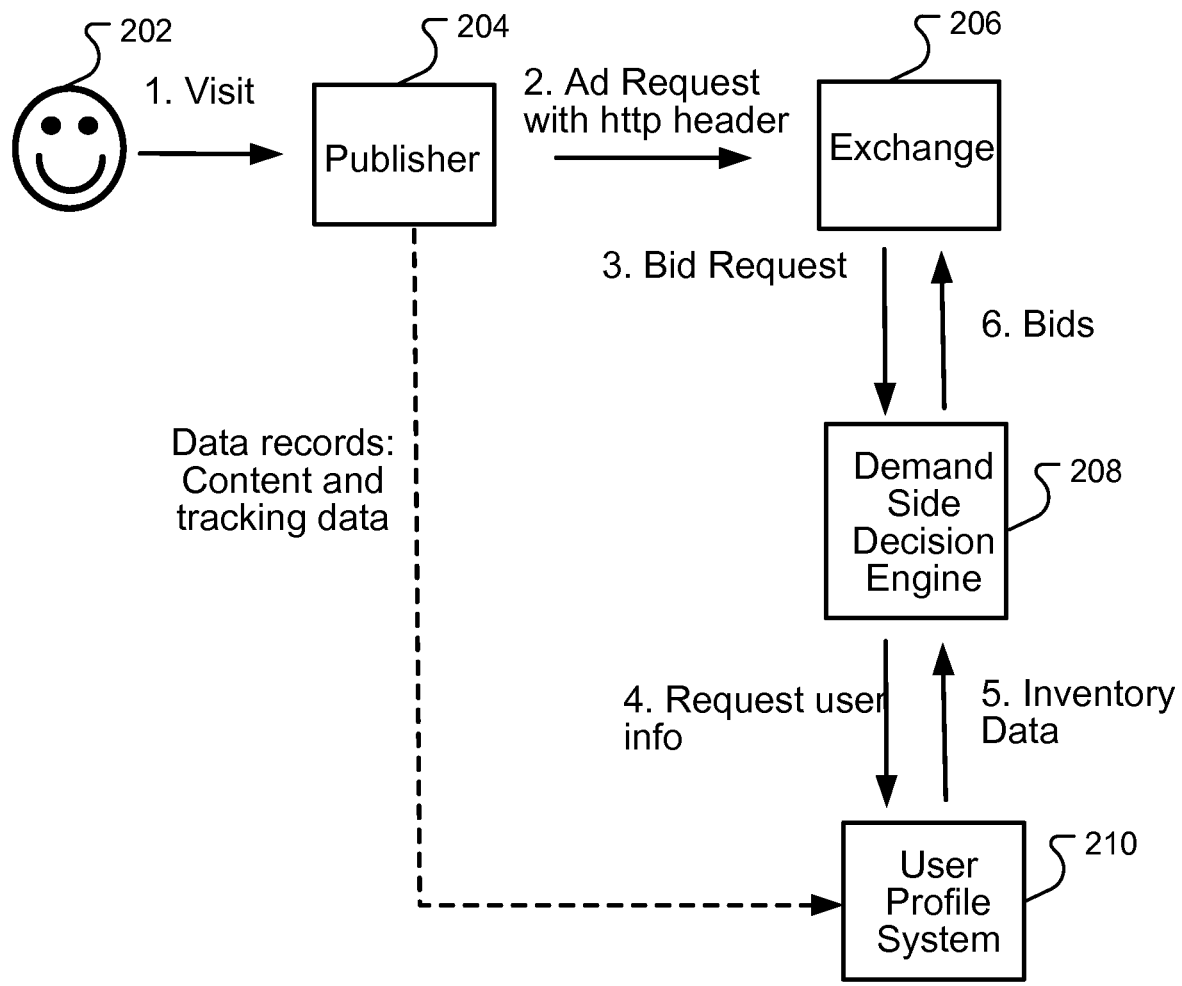
FIGS. 2A-2C illustrate various examples of user data services.
Figure 2B:
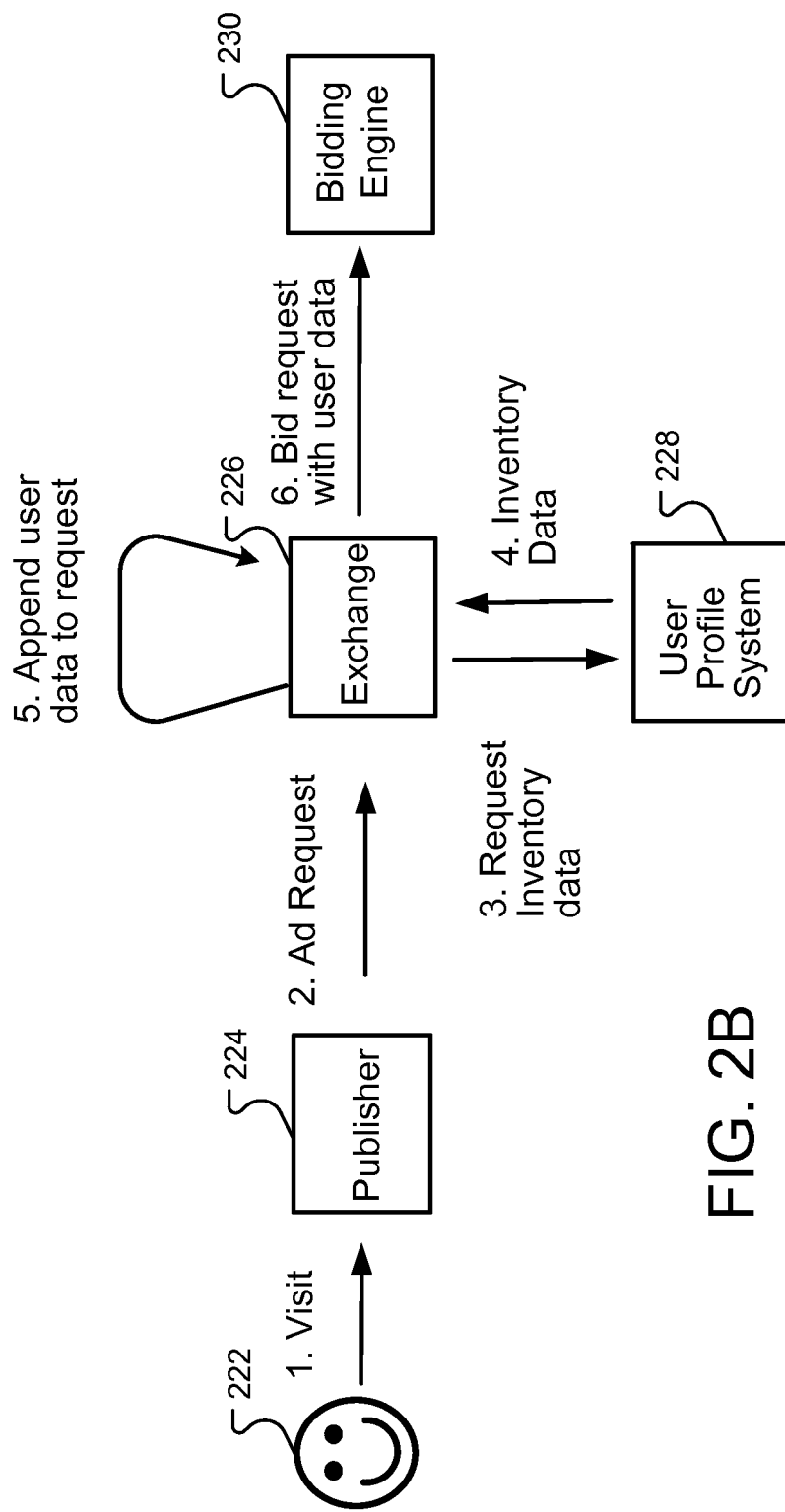
Figure 2C:
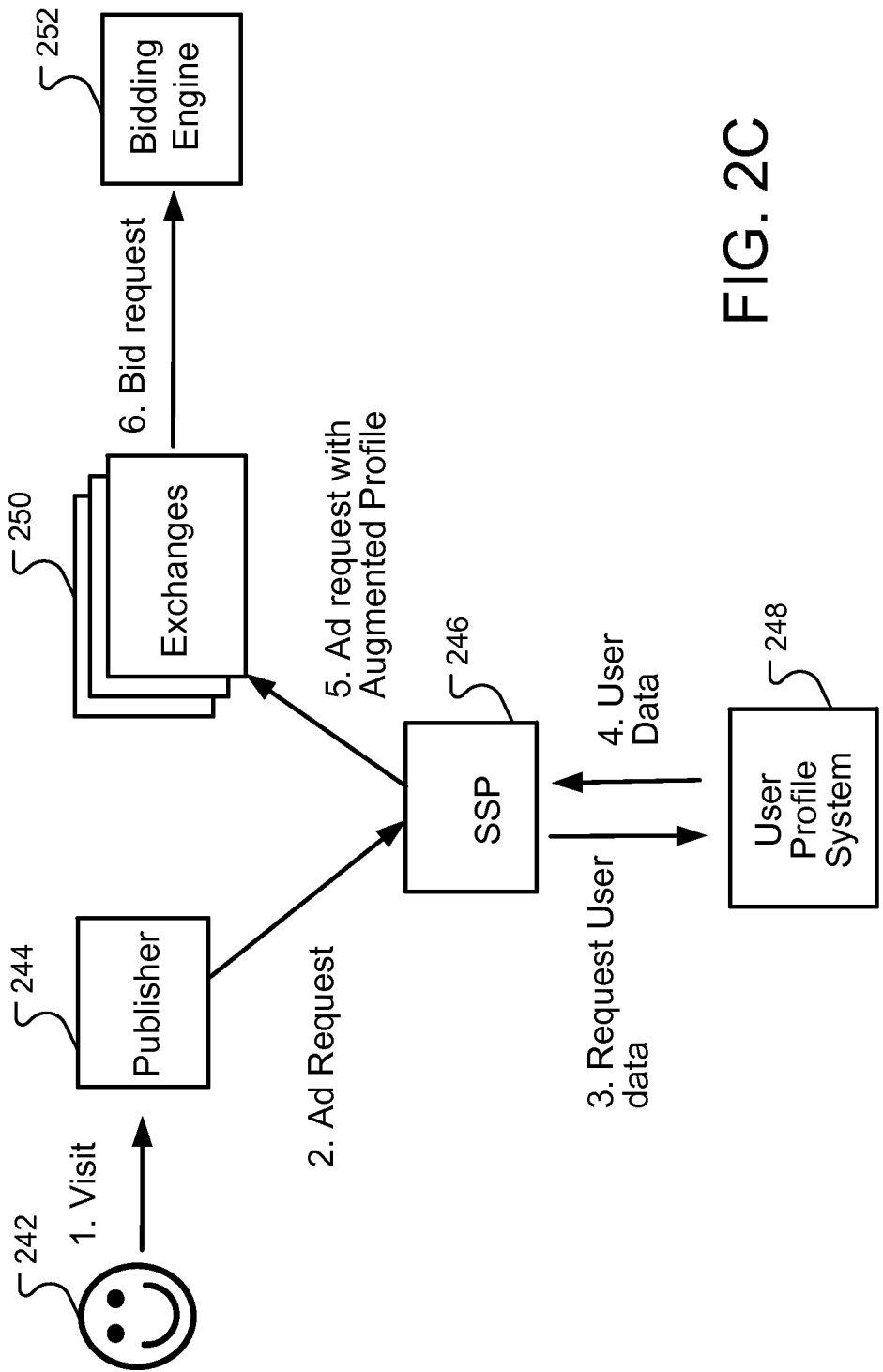

FIGS. 2A-2C illustrate various examples of user data services. FIG. 2A illustrates an example of a demand side data engine interacting with a User profile system. In FIG. 2A, the user data may be used to make buying decisions and channel optimization. In general, a demand-side platform (DSP) may allow buyers of digital advertising to manage multiple ad exchange and data exchange accounts through one interface. A user 202 visits a website or other content provided by a publisher 204. The publisher 204 initiates a real-time bidding for the display of online advertising to the user. Generally, the bidding takes place within the ad exchanges 206. The ad exchange 206 can provide the bid request to a demand side decision engine 208. The demand side decision engine 208 requests user information (for example, information about the user 202) from a User profile system 210. The User profile system 210 can maintain information about different users. The User profile system 210 provides information about the user to the demand side decision engine 208. The demand side decision engine 208 provides bids to the exchange 206. The exchange 206 may select an advertisement based on the bids and bid information.

FIG. 2B illustrates an example of a user platform for a supply side engine. In general, a supply-side engine can enable publishers 224 to manage their advertising impression inventory and potential maximize revenue from digital media. When a user 222 visits a website or content provided by a publisher 224, the publisher makes an ad request to an exchange 226. The exchange 226 requests inventor data from a user profile system 228. The user profile system 228 identifies the user 222 and provides inventory data to the exchange 226.

The exchange 226 appends the user data to a bid request and sends the bid request to a bidding engine 230. The bidding engine 230 can use the user data to identify suitable ads to present to the user 222.

FIG. 2C illustrates an example of a supply side engine. In this example, user data is sent to multiple exchanges for bidding. A user 242 visits a website or content supplied by a publisher 244. The publisher 244 requests an advertisement to present to the user 242 from a supply side platform 246. The supply side platform 246 sends a request for user data to a user profile system 248.

The user profile system 248 identifies the user 242 and obtains user data about the user. The user profile system 248 sends the user data to the supply side platform 246. The supply side platform 246 sends the user data to multiple exchanges 250a-c. Each exchange 250a-c may send bid requests to a bidding engine 252.

Figure 3:
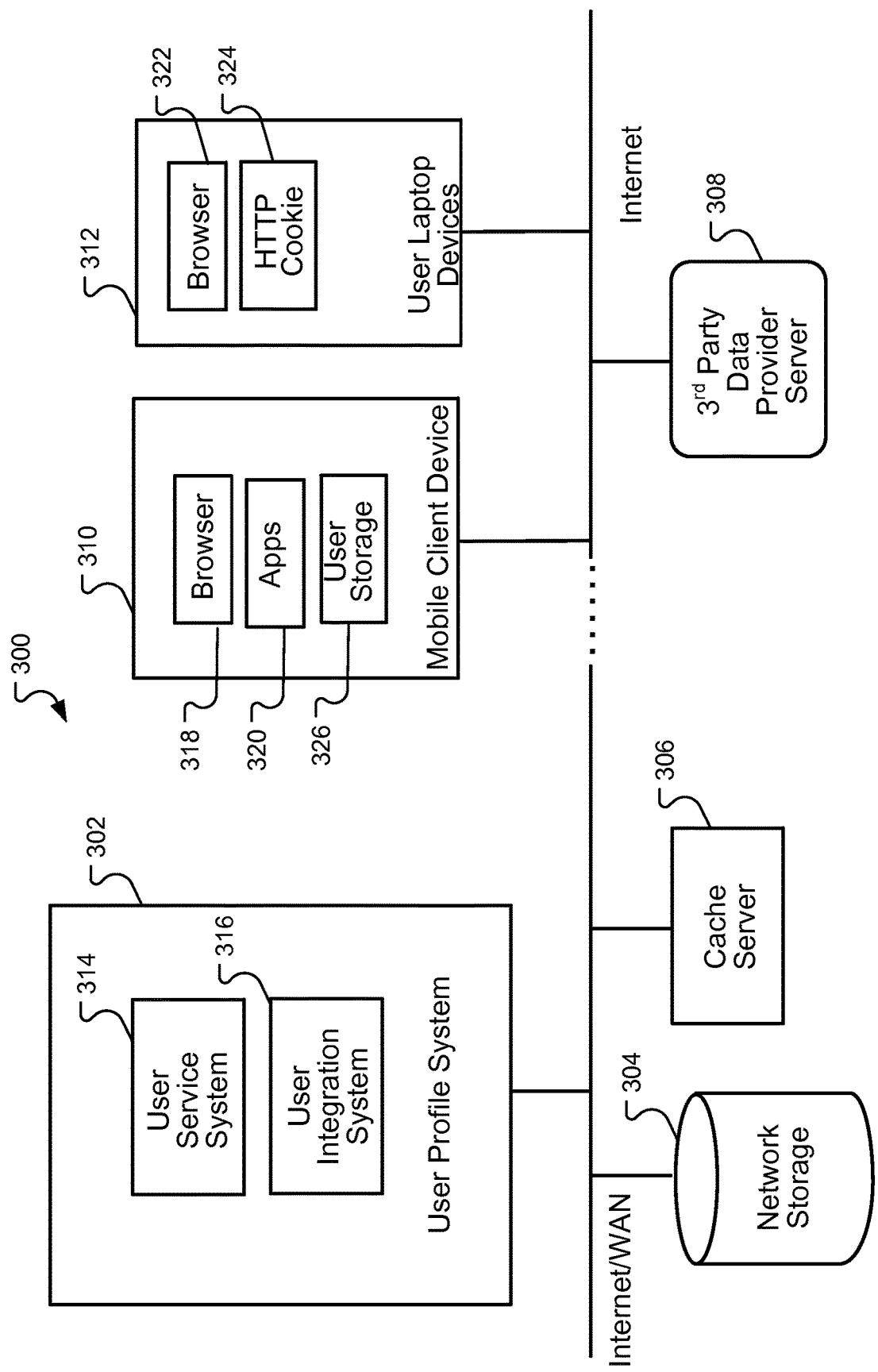
FIG. 3 is a block diagram of another example of an environment for user profile processing.

Referring to FIG. 3, a block diagram of another example of an environment 300 for user profile processing is shown. The environment 300 includes a user profile system 302, network storage 304 (for example, a storage area network (SAN)), a cache server 306, a third party data provider server 308, and multiple client computing devices (including, for example, a mobile client device 310 and a user laptop device 312). Other client computing devices can be included, such as mobile phones, a tablet, a laptop computing device, etc. The client device can include, for example, a browser 318 and mobile applications 320. The browser 318 can be a specialized application that is designed to accept and present data provided over the Internet. The mobile applications 320 may be specialized programs designed to run on mobile client devices (such as smart phones or tablets.) A user laptop device 312 may include a browser 322. The browser 322 may include one or more HTTP cookies 324 in order to provide a server with information about the user of the device. In general, an HTTP cookie 324 is a small piece of data sent from a website and stored in the user's browser. HTTP cookies 324 may persist on the user's browser even after the user is no longer viewing the website.

In some embodiments, the user profile system 302 includes two subsystems: a user service system 314 and a user integration system 316. The two subsystems, as well as programs executing on the subsystems, may be stored and executed on one or more physical servers. The network storage 304 may be, for example, a network accessible database. User data can be stored in the network storage 304. The user data can include data for user identification and profile attributes. The user identification and profile attributes may be managed and updated by programs included in the user integration subsystem 312. Data consumers access the user data through the user service subsystem 314. Data service programs are stored and accessed through one or more physical servers. In some embodiments, the one or more physical servers may include a CPU, GPU, main memory, local storage, network interface cards, and display devices for user interactions. All the user data may be stored in the network storage 304. Alternatively, a portion of the user data 326 may be optionally stored on user devices (with permission of the end users) and synchronized with a central database (for example, in the user storage 326). To provide fast access, a portion of data can be stored in caching modules, which may comprise a distributed memory system accessible through a fast network or local memory on processing servers.

Figure 4:
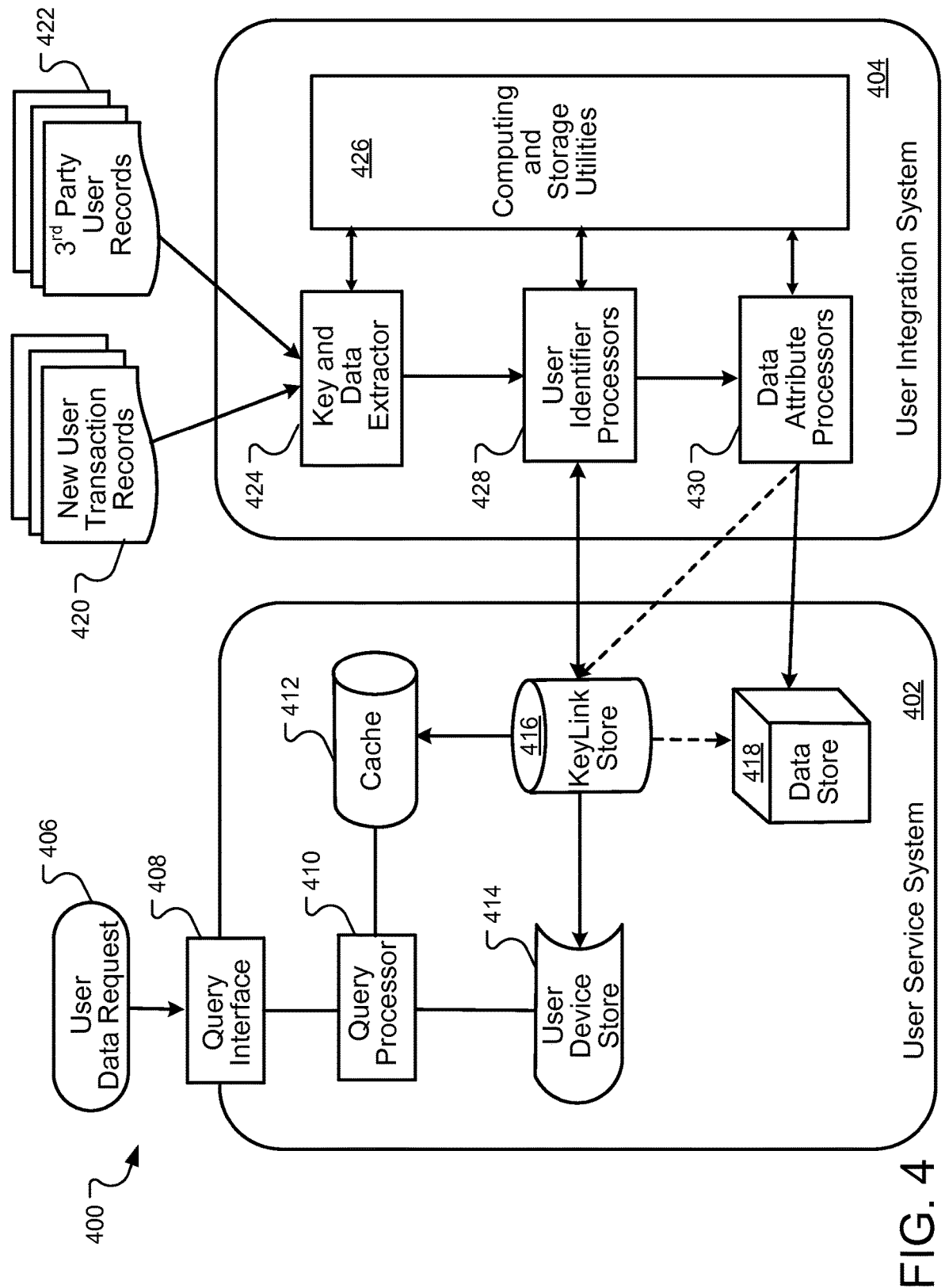
FIG. 4 illustrates an example of a user profile system.

FIG. 4 illustrates an example of a user profile system 400. The user profile system 400 includes a user service system 402 and a user integration system 404. The user profile system 400 may be, for example, the user profile system 302 of FIG. 3. In some embodiments, the user profile system 400 can store and maintain user key data and profile attribute data. User key data includes information for identifying users and the user profiles. User identifiers, device identifiers, and signature data together with algorithms that process data can identify users. Once identified the user profile may be provided to consumers (for example, advertisement exchanges). Requests from data sources are processed by user identifier processors in order to extract keys and signatures. Data attributes are extracted and matched using proper keys and algorithms.

The user service system 402 may accept requests for user data 406. The requests for user data 406 may be provided through a query interface 408. For example, the requests may be sent to the user service system 402 using the HTTP protocol. A query processor 410 receives the request and determines the user about whom data is requested; for example, the user service system 402 may use information provided in the user data request 406 to determine the appropriate user data (stored in the data store). In some implementations, the user data request 406 may contain device identification information, that is, information sufficient to uniquely identify a user device. The query processor 410 may access the user device store 414 to identify a user associated with the device.

In some implementations, recently accessed data, or data that is determined to be accessed in the near future, may be stored in a cache 412. In general, a cache is a computing component that stores data so future requests for that data can be served faster; the data stored in a cache might be the results of an earlier computation, or the duplicates of data stored elsewhere.

In some implementations a key store link 416 can provide a bridge between the user device and the privacy protected user data in the data store 418.

User data may be provided to the user service system 402 using the user integration system 404. New user transaction records 420 and third party user records 422 can be provided to the user integration system 404. A key and data extractor component 424 may parse and normalize the incoming records. Computing and storage utilities 426 can be used by the different components in order to perform their operation. For example, computing and storage utilities 426 may enable parallel processing, batch processing, data storage, etc. . . .

Once the keys and data are extracted from the records, a user identifier processor 428 identifies the user associated with the records. In some implementations, multiple records may be associated with a user. In some implementations, the records provided may be associated with multiple users. The user may be identified using the techniques described below.

A data attribute processor 430 may process the extracted data to identify attributes to associate with an identified user. The attribute process is described further below.

Figure 5A:
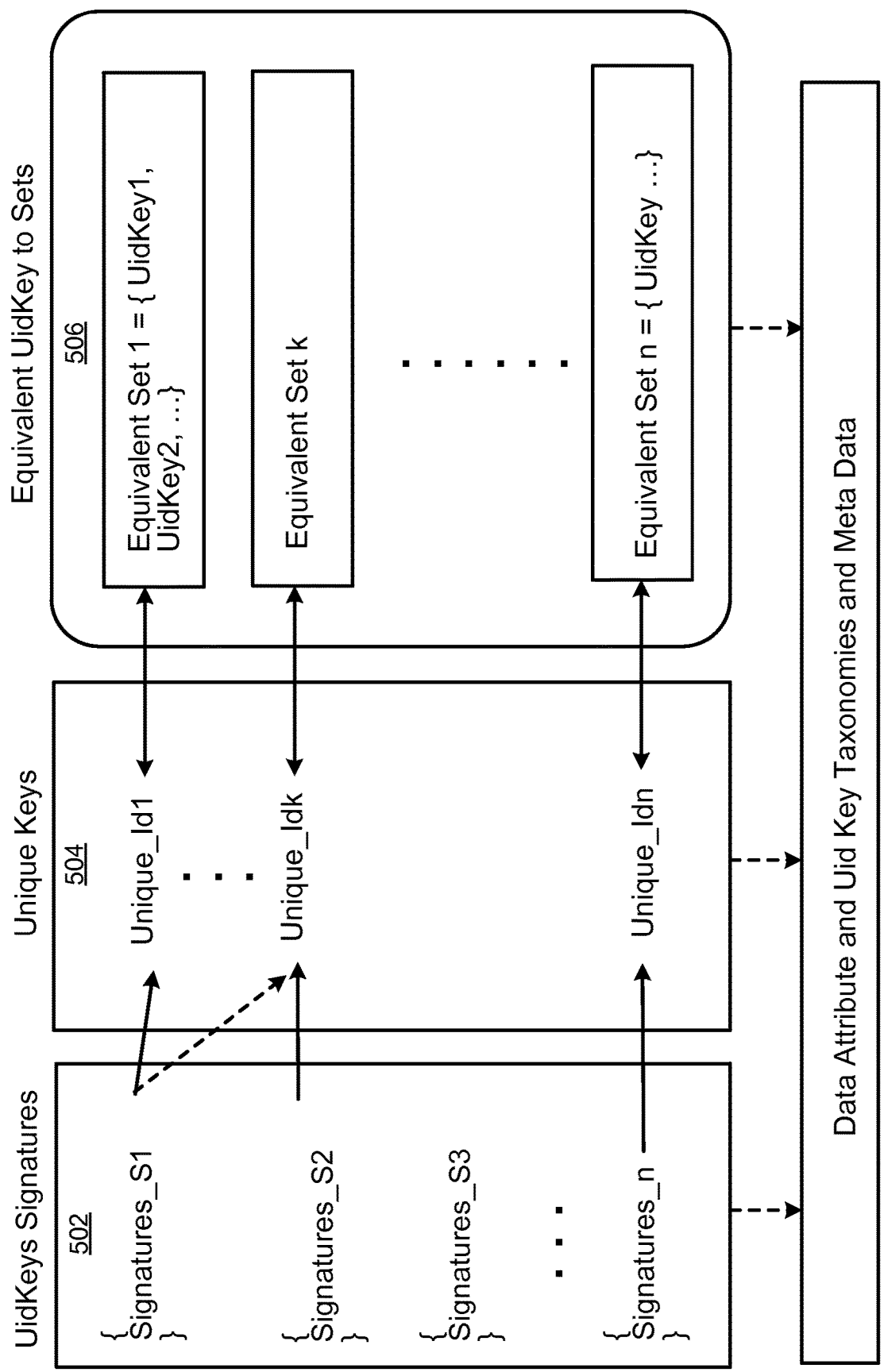
FIGS. 5A-B shows charts illustrating an example of the relationship between user identifiers and identification keys.

FIG. 5A shows a chart 500 illustrating an example of the relationship between user identifiers and identification keys. Each user may be uniquely identified by a device and media agnostic identifier, referred to as unique keys 504 or unique user identifier. The unique keys are linked together to a set of device or media dependent identifiers, referred to as UidKeys 506. Examples of UidKeys may include, device identifiers such as an identifier for advertisers (IDFA) for iOS devices, Advertising ID on Android, unique device identifier (UDID) or encoded UDID, OpenUDID, Android Id, cookie, media access control (MAC) Addresses, or any other device identifiers. In addition, a set of user dependent signatures, referred to as UidKeys signatures 502, are associated with each of the unique user identifiers. Examples of UidKeys signatures 502 may include an Internet protocol (IP) address or a qualified IP address (such as a Wifi address), client response time, device clock offset, device clock skew, location information such as street segment, media content category and usage pattern including frequency and time period, etc.

Figure 5B:
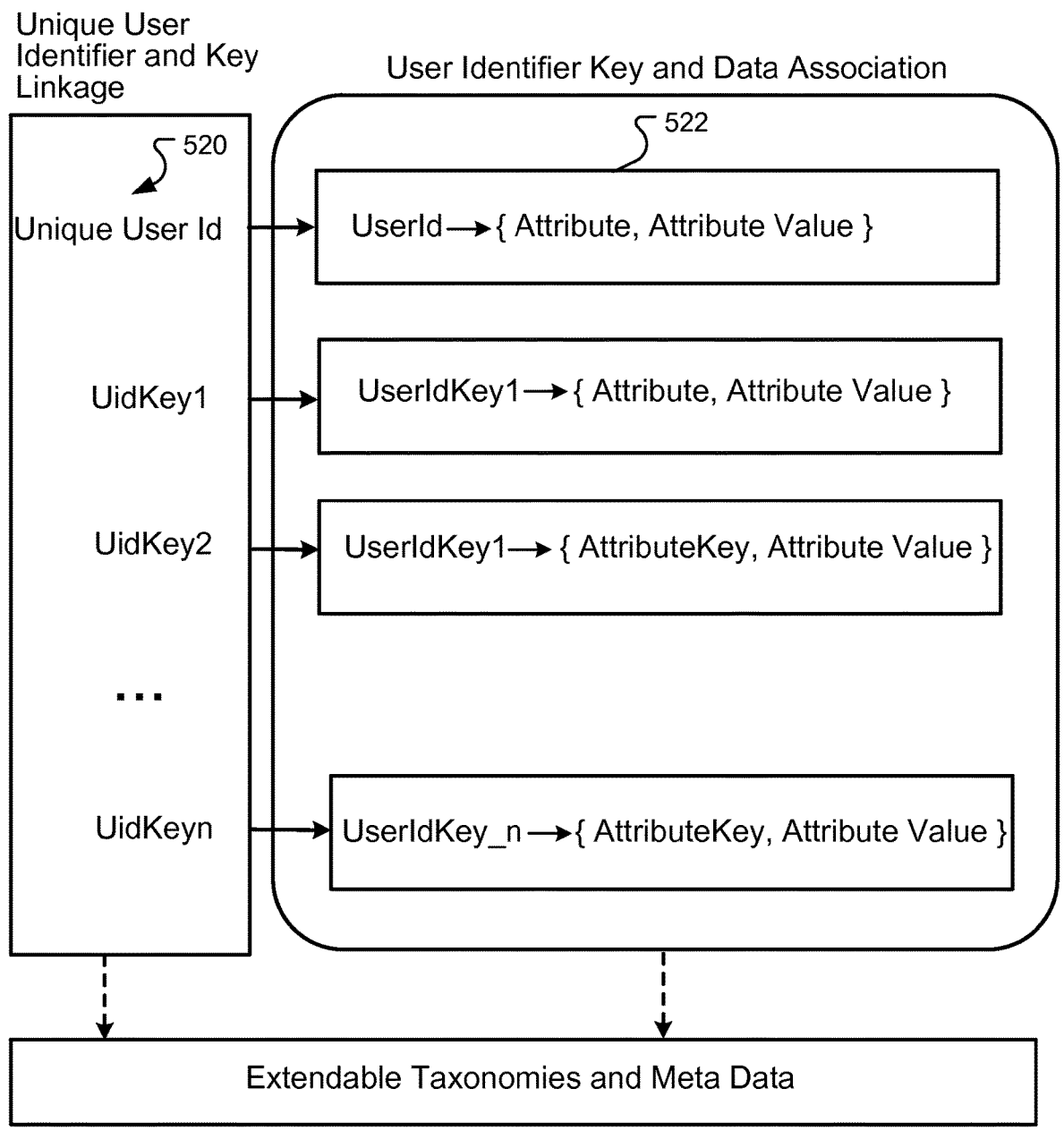

Now referring to FIG. 5B, a chart illustrating an example of the relationship between user identifiers, identification keys, and user data is shown. Each unique user identifier 520 (for example, the unique user keys 502 of FIG. 5A) is associated with a set of user data attributes 522 (e.g., AttributeKey, Attribute value) for describing user profiles. For example, the attribute key may be a name or string associated with a particular attribute (for example, age group, income group, interest, gender, etc.). The attribute value may be a value that describes the user according to the attribute key (for example, the attribute key "age group" for a user may have the attribute value "18-25'"). In general, the attribute key and attribute value may be a key-value pair. A key value pair can be, generally, a set of two linked data items: a key, which is a unique identifier for some item of data, and the value, which is either the data that is identified or a pointer to the location of that data In some embodiments, each unique user identifier may be associated with more than one set of user data attributes. Each of the user data attributes can be specified by a taxonomy which specifies the data types, semantic description, source, encoding, pricing model, etc.

In some embodiments, the unique user identifier 520 serves as a bridge among all other identification keys and UidKeys. The unique user identifier's role is similar to a social security number in that it can be unique such that no two users have the same identifier. In some embodiments, the unique user identifier 520 may be kept on the server side and may be a server side identifier that is not revealed to user data consumers. For user data transport with from different devices, UidKeys and signatures maybe used instead for real-time data requests as well as integration with third party data from offline and other sources.

In the situation where the UidKey contains information that is may be used to identify the user (such as personal identifiable information) and the information may not be stored as a matter of policy, instead a one-to-one and irreversible mapping to anonymous keys can be used. Such mapping can be obtained by applying a perfect hashing function or general cryptographic hashing function (for example MD5 and SHA-1 with possibility of collision, and SHA-3, RIPEMD, and RTR0). The hashed key may be used as in place of UidKey that contains user identifiable information. As used herein, a perfect hashing function is a hashing function that for a set S maps distinct elements in S to a set of integers, with no collisions.

In some embodiments, the UidKey and the linkage to the corresponding unique user identifier may be stored in memory. Storing the UidKey and linkage in memory can speed up real-time retrieval of user data and UidKeys. With multiple devices and media channels, storing linkage table between unique user identifiers and UidKeys is proportional to the number of keys and the number of users. In some embodiments, storing the UidKeys and linkage in memory can add considerable memory and storage overhead. A special hashing maybe used in place of the key linkage table to reduce the amount of memory and storage needed.

Figure 6:
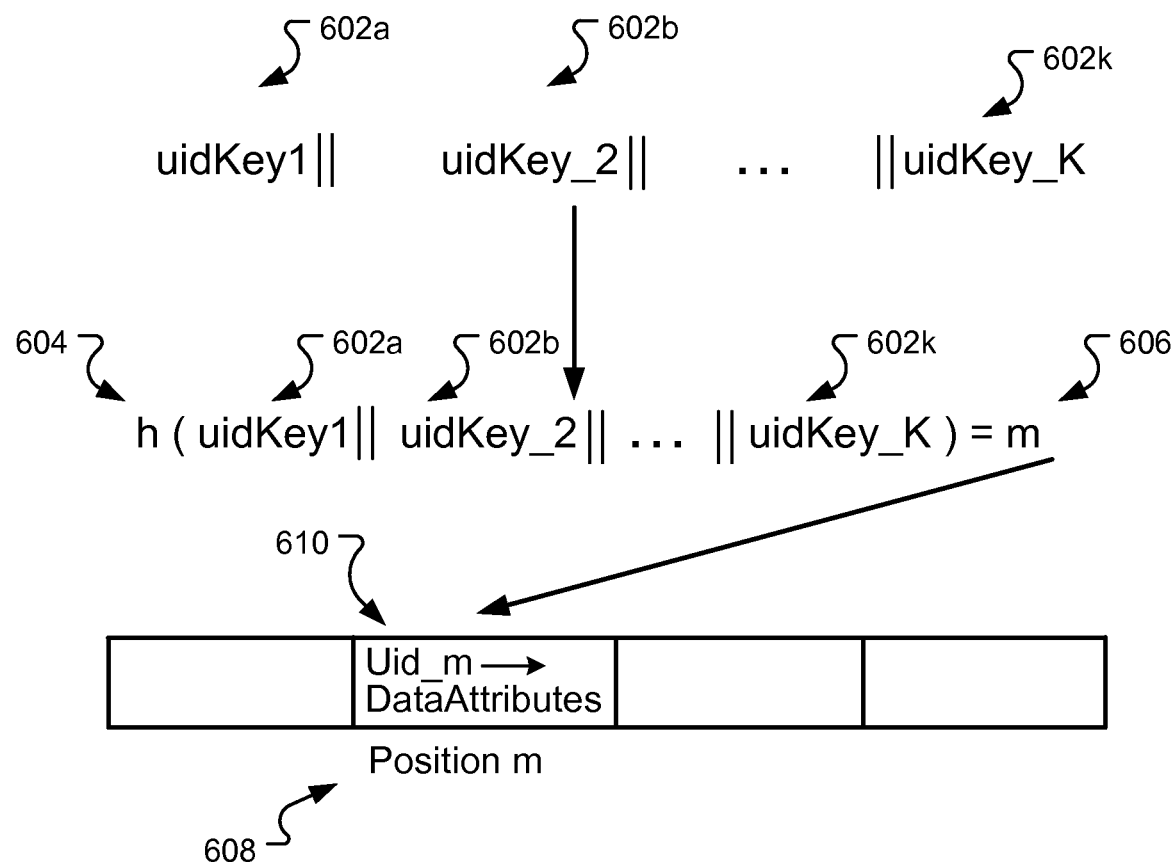
FIG. 6 illustrates an example of a minimal perfect hashing for UidKey or data storage.

FIG. 6 illustrates an example of a minimal perfect hashing for UidKey or data storage. UidKeys 602a-k representation are standardized by padding (the length of each key is made to be identical), the standardized UidKeys are concatenated together, and then the minimal perfect hashing function 604 is applied to the concatenated keys to create an integer m 606, which is then used to compute the location 608 for storing the Uid 610. In some embodiments, user data can be stored without the UidKeys.

In some embodiments, user data records from different sources are integrated together to form a complete picture of the user. These different sources may include ad servers, user interaction tracking with media content such as games, videos, e-commerce sites, and other apps, as well as Web browsers and includes devices such as laptop of mobile devices such as tablets and mobile phones, Mobile App applications. Sources can also include ad campaign tracking system and online and offline vendors such as DATA-LOGIX, ACKIOM, BLUEKAI, etc. Sources can also include social media data, location data providers etc. In some embodiments, the data from the data sources can be associated with a user using the model described in FIG. 5A along with taxonomy data attribute specifications.

Figure 7:
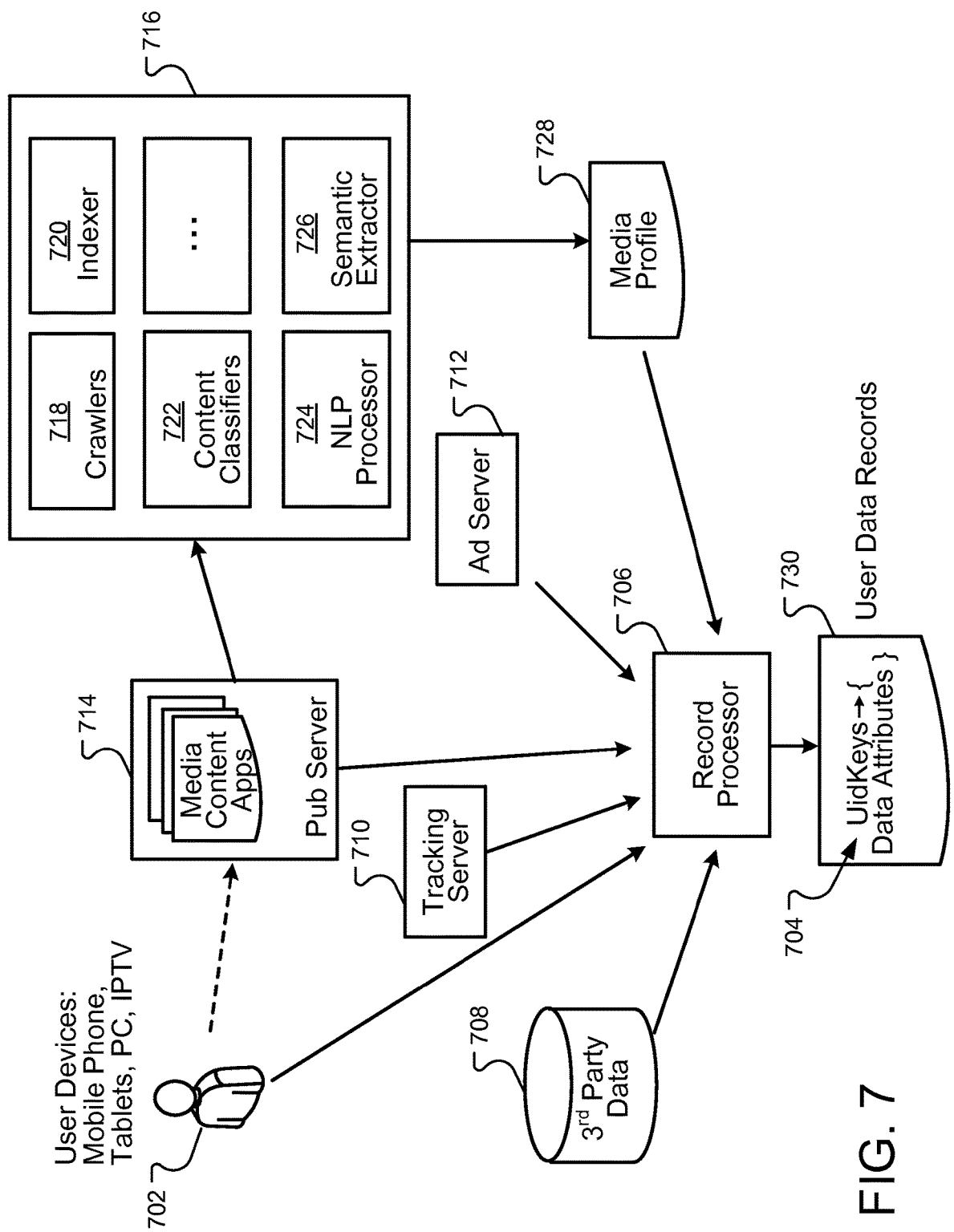
FIG. 7 illustrates an example of an environment for user data record extraction.

FIG. 7 illustrates an example of an environment for user data record extraction. In some embodiments, user data may be extracted from various user devices 702, for example and without limitation, a mobile phone, tablet computing device, a personal computer, connected TV, and internet protocol television (IPTV). Each data record may be decoded for two types of records, user identification keys and user data attributes. In some embodiments, deterministic user id keys as well as signature key sets and deterministic rules and probabilistic rules (such as described in UNIQUELY IDENTIFYING A NETWORK-CONNECTED ENTITY, U.S. Pat. No. 8,438,184 issued May 7, 2013 and incorporated herein by reference) are used to check if the user exists in the current system.

A record processor 706 may receive information about the user from a variety of different sources. For example, information about the user can be received from the various user devices 702. Information about the user can also be received from third party data providers 708, tracking servers 710, and ad servers 712. Information about the user can also be obtained from public servers 714. For example, the user may maintain a social media presence. The public servers 714 may provide the information about the user to the record processor 706 directly. Data from the public servers 714 may also be extracted by a variety of different web processing applications 716, including but not limited to crawlers 718, indexers 720, content classifiers 722, natural language processing (NLP) processors 724, and semantic extractors 726. The information extracted by the web processing applications 716 may be combined into a media profile 728 for the user. The media profile 728 may be received and processed by the record processor 706.

The record processor 706 processes the information about the user received from the different sources and stored at least some of the information in data attributes 704 in a user data record 730.

Figure 8:
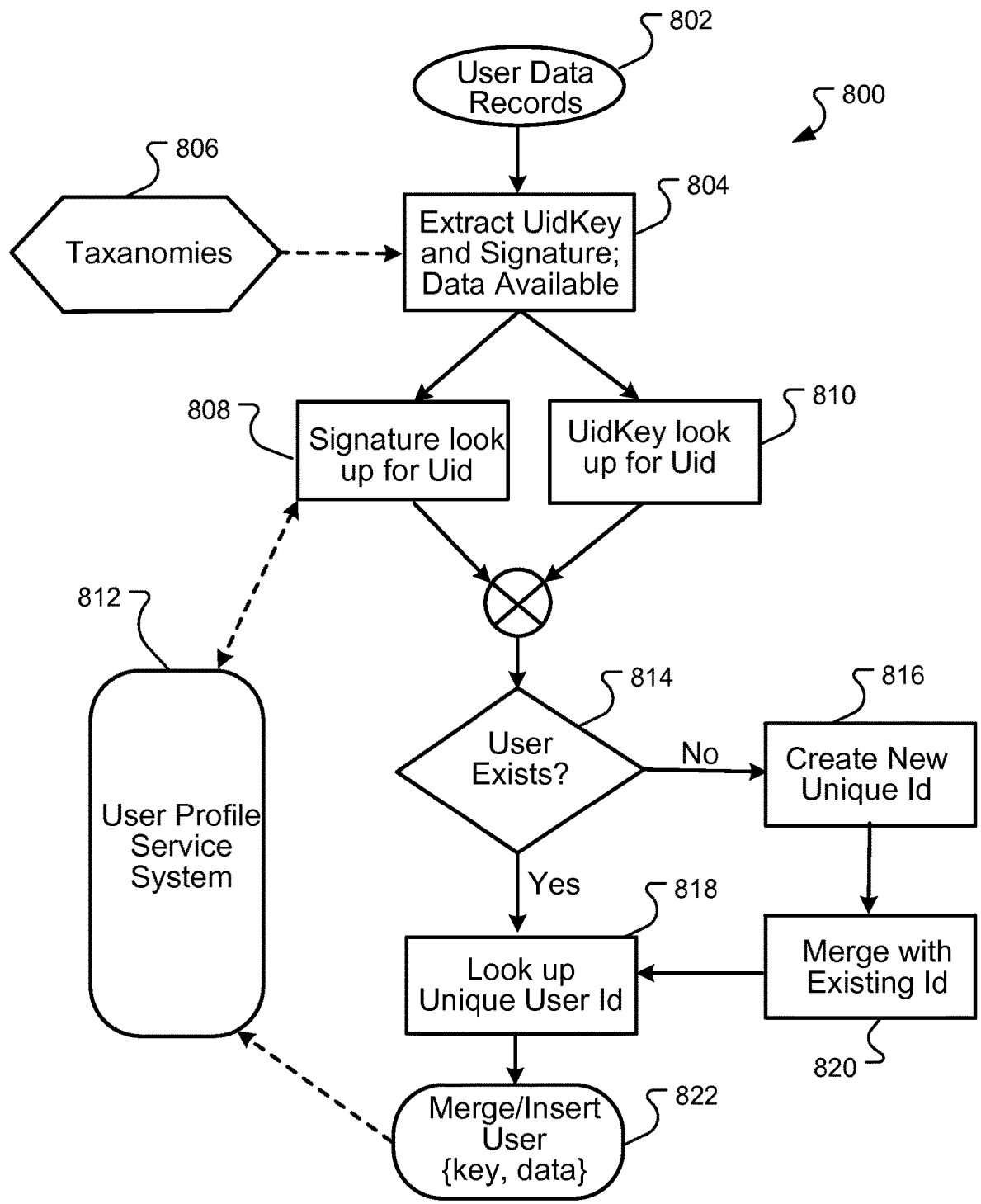
FIG. 8 illustrates a flowchart of an example process for user data processing integration.

Although FIG. 7 demonstrates a parallel process, the process can be carried out in any sequence. For example, FIG. 8 illustrates a flowchart of an example process 800 for user data processing integration. In some embodiments, it is advantageous to first check if a deterministic key such as an IDFA exists. If the deterministic user id key does not exist or cannot be used to define a user uniquely, such as IP address of WiFi routers, then additional signature rules are used for the lookup. If the user already exists, then extracted data attributes are inserted into the database using one or more of the UidKeys or the unique user identifier, depending on the data source and type. It should be noted the process is for demonstration purposes only. There might be many types of variations from the described process, for example, actual data can come in real-time, batch, and streamed over. Different embodiments of the processing steps can be carried out through real-time and online record by record processing, stream processing, and batch processing accordingly.

The process 800 receives 802 user data records. The user data records may be received from a variety of different sources, as discussed above.

The process 800 extracts 804 UidKey and/or signature data attributes from the records. The process may extract the UidKey and/or signature data attributes according to taxonomies 806 that define the structure of the user data records. The UidKey may be, for example, the UidKeys 506 of FIG. 5A. The signatures may be, for example, the UidKeys Signatures 502 of FIG. 5A.

The process 800 looks up a UID using the signature (808) or the UidKey (810). The process 800 determines 814 if the user exists. If the user exists then process 800 may look up 818 the unique user id with the user profile service system.

If the user does not exist, the process 800 creates 816 a new unique id for the user. The process 800 merges or inserts 802 the new unique id to the existing ids, for example if a update the user data from the user profile service system 812.

The process 818 looks up 818 the unique user id, for example, in a user profile service system 812. The process merges or inserts 822 the user data (for example, the key value attribute 522 of FIG. 5B).

The user data attributes may include many different types of information, including demographics attributes such as age, gender, ethnic groups, culture groups, psychographic data such as personality types, culture background, languages the user speaks; interest in products, Web and video content and categories, intention in buying certain products, application usage behavior, past transaction of products of various types, location of travel, residence, interest, devices used to access content; interactions with various media, etc. One or more taxonomies can be used to describe and standardize the encoding and definition of various user attributes in association with products, media application content, and others.

For example, IAB taxonomy can be used to describe media content for Web and applications categories. In some implementations, the following types of attributes can be specified and extracted based on using various taxonomies connect to metrics and scores:

Interest, in content taxonomies such as IAB, DMOZ, apps classification, etc.
intention, in product attribute such as retail, automotive, finance, CPG, Entertainments, computing products, Pharm and health care, telco, Media, etc.
propensity, in a set of user action attributes
live-time value in business attributes Furthermore, each of the attributes can have sub categories. Custom user segments can be built on top of these know user attributes by defining classification rules. For example, a custom segment can be defined by applying a custom rule to the segment attributes, as follows:

Custom segment=Custom Rule(Segment Attributes)

For each user, various types of scores can be computed involving the attributes, as a way illustration, userId→{AttributeName=NameSpace.TaxonomyLevel1.TaxonomyLevel2,ScoreType,Score}.

Figure 9:
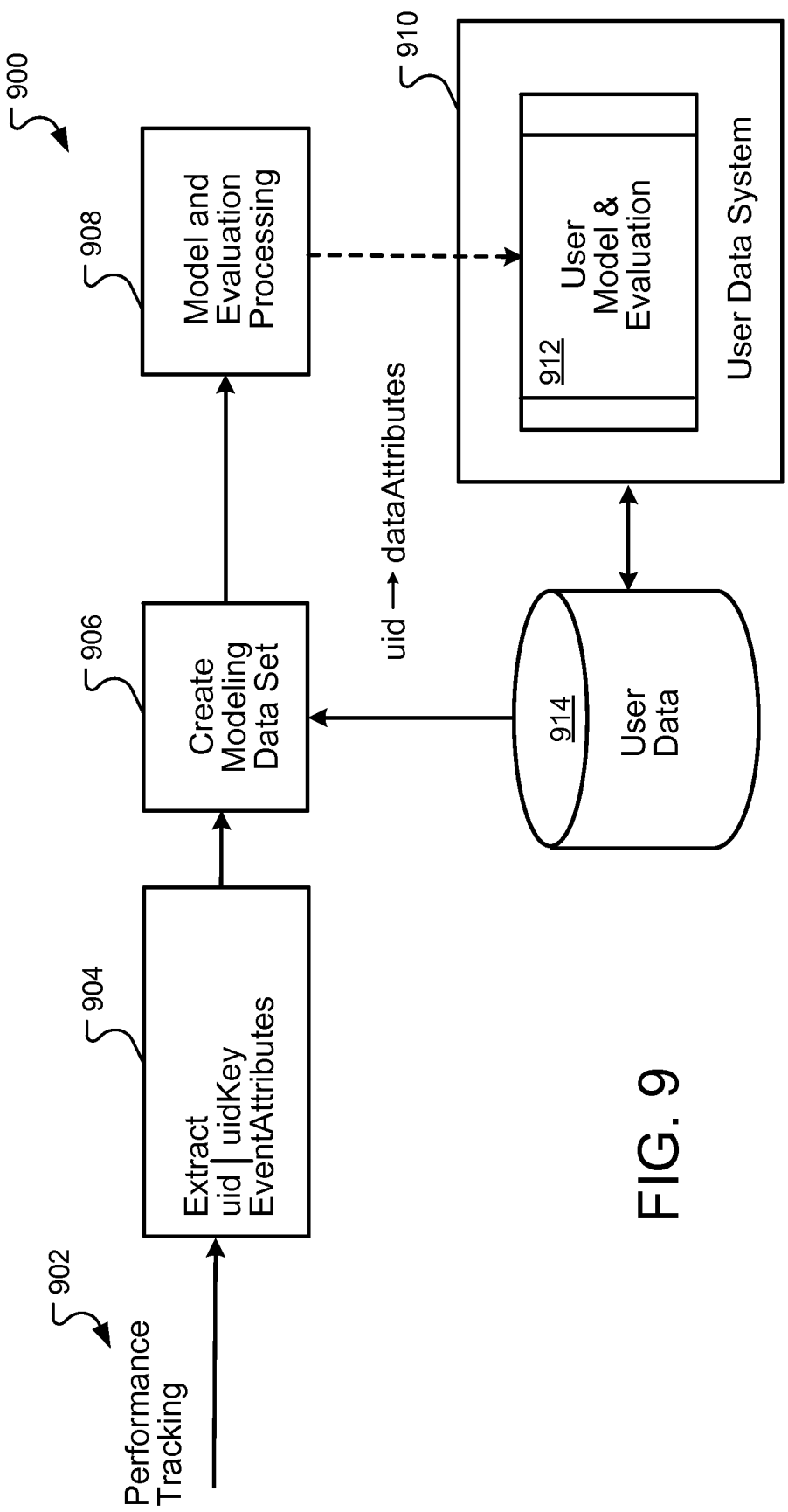
FIG. 9 illustrates an environment for extracting and building data models.

ScoreTypes may be observed scores and predicted, metrics may include frequency, recency such as time laps FIG. 9 illustrates an environment 900 for extracting and building data models. User interaction and performance tracking 902 information may be received by the environment 900. In general, tracking information is information that describes previous user interactions with one or more advertisements. In some embodiments, tracking data may be obtained and extracted from the data sources using JAVASCRIPT or pixels embedded the Web pages, and code segments or SDK for mobile apps, and video stream logging, ad serving and interaction logs serve as a data source. Tracking data items may include the following: [timestamp, location, device profile, mediaId, name, start time, end time, activity].

Timestamp may be further encoded and transformed into time of day, numerical 6:00-9:00 before work, 9:00-12:00 morning etc. Activity may include click, playing music, opening an app, etc. Location may include latitude and longitude, as well as street band, zip, country, state, city, location and location types may include home, work, shopping mall, etc.

The data attributes can be extracted from the tracking data by an extract component 904. During the data extraction, UidKeys such as IDFA or cookies maybe associated with each of the transaction records. In some embodiments, metrics including counts, frequency, recency, interaction durations, etc. can be aggregated for one or more of the data attribute types from the data sources. These data attributes may be stored in association with the specific UidKey or directly linked to the corresponding unique user identifier. Data can be aggregated or predictive models 912 or rule store can be built using the aforementioned attributes as input.

After data attributes are extracted and associated with different keys, the data can be inserted into a data store 914 by performing operations on the UidKey and attribute table. In some embodiments, as a way of illustration, the following pseudo structured query language (SQL) operations may be performed:

```
Insert into Udb where
    in.userIdKey = udb.userIdKey &
    MapTable( in.dataAttributeKey, outDataAttributeKey) = true,
    (userIdKey, attributeId, value)
OR in case of signatures
Insert into Udb where
    RScore (in.Signature, udb.Signature) > udb.threashold(in.Signature),
    MapTable( in.dataAttributeKey, outDataAttributeKey) = true,
    (userIdKey, attributeId, value)
```

In some embodiments, data from third parties can be integrated into the user data system 910. The data from third parties may be modeled similarly with a userId key associated with data attributes. Third party data attributes can be mapped to existing data through taxonomy mapping, using either automatic or manual mapping rules. In some embodiments, the third party data attributes may be integrated to the database as independent attributes. In one embodiment, the same UidKeys are used, such as in the case of IDFA or Android Advertising Id. It may also happen, as when the data is associated with IP of home Wi-Fi router, the incoming data records cannot be resolved to a unique user. In this case, the third party data attributes may be integrated at the IP level. Additional signature attributes such as content, location, and time of usage can be extracted and used as input to a signature extraction rule to resolve to a single user level through unique identification process. The rules can be stored in, for example, a rule store.

In the situation where the UidKey for integration may contain personal identifiable information or other sensitive information as social network registration key, email address, social security number etc., the following process may be used to integrate with the third party data. For each incoming UidKey, a one-to-one mapping between the key and an anonymous mapping is generated by applying a cryptographic hashing function, for example Hash(UidKey). The key to data association UidKey→{DataAttributes} can then be replaced by a new association Hash(UidKey)→{DataAttributes}. Data exchange partners sharing the same hashing functions can now exchange and integrate data anonymously.

In addition, a secure integration clearing house can be established where the confidential UidKeys from different sources are used to merge the data. In such an embodiment, the data only appears in memory and is not stored in a persistent media, and the keys are deleted as soon as the merge the processing is complete.

In some embodiments, some of the user data attributes may not be directly obtained through tracking or third party sources. For example, in some embodiments, certain demographic attributes may be inferred attributes. Data about users desired data attributes are pulled from the database or third party sources. In some embodiments, other attributes which are common to all or a subset of user of whom the inferred attributes are to be derived can be pulled from the database or third party source. These other attributes can be used as prediction attributes. Once the desired data attributes have been pulled, a supervised learning algorithm executing in a model and evaluation processing component 908 can be used to extract an inference model of the desired attributes. The inference model (for example, the user model and evaluation component 912 in the user data system 910) is then used to create inferred attributes for users without such attributes.

In some cases, inference models can have low accuracy and therefore cannot be used directly for all users, especially when the target attributes involve multiple values such as in the case of income level. The following method or variations may be used to address this problem. In some embodiments, a user data set with the inferred attributes can be split into two sets, a training set and a test set. The training set can be used, along with an algorithm, to output a ranking function, such as a probability score or likelihood ratio. The ranking function can then be used with the test set to generate a lift curve on the predicted attributes. For a user without the inferred attributes, the model is then used to generate a ranking score. In some embodiments, the lift curve creates an indicator whether the inferred model results should be used based on pre-specified accuracy or equivalently percentage of the users to apply the inference model.

In some embodiments, other measurement mechanisms, for example cross validation and bootstrap, can be used in place of training and test sets to generate the lift curve. Furthermore, while the inference model can be used to insert data to the database, in some embodiments, the inference can be done in real-time with the model. In both cases, the model may be used only when the ranking score is above certain level of lift, thus allowing using models with low prediction accuracy to do inference confidence.

In some embodiments, a similar process can be used to build models for scoring users in different ways. For example, to build behavior interests scores in context categories, intention scores can be associated with product and service categories, and propensity of actions for events (clicks, conversions, etc.) can be associated with ad event attributes, and lift time value scores can be associated with specific business categories.

In some embodiments, to retrieve user data for one or more users, user identifiers along with one or more dataAttribute specifications, and qualifiers can be used. To retrieve data attributes of one or more users, incoming queries can be translated into the following parameters:

One of more user identification key, key signatures, and user data attributes specification following key-value involving using key identifiers or syntax defined by taxonomy specification for categorical variables, and key and numerical range for numerical variables. For example "user.demo.age=AGE_GROUP VALUE", "Context.IAB.IAB1", etc.

Furthermore, AND/OR, NOT operations can be used on the key-value and key range basic level of language conjunction and disjunctions of terms can be implemented using base operations AND/OR, NOT, along with numerical range operations. More complex operations can be composed using the base operations.

Figure 10:
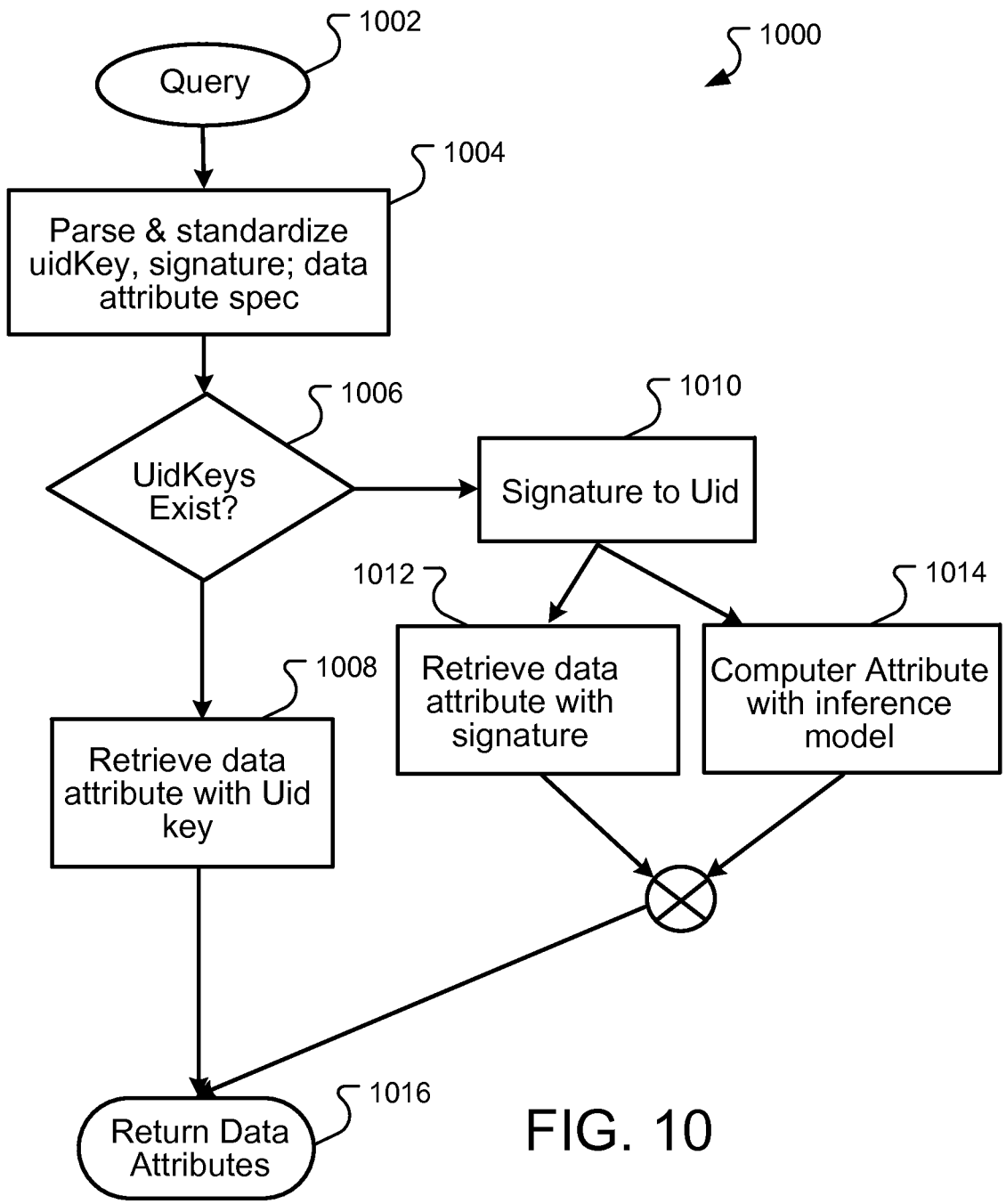
FIG. 10 is a flow chart of an example of a process for serving user data.

FIG. 10 is a flow chart of an example of a process 1000 for serving user data. In some embodiments, serving user data involves receiving 1002 a query, and parsing 1004 the request for one or more UidKeys and signatures, along with user data attributes specifications. If the UidKey is found in the request, it can be used to specify the user. If one of more of the UidKeys exists 1006, any one of the UidKey can be used to retrieve the data 1008. In some embodiments, the user data may exist, however a data record never came with the specific UidKeys previously and it is associated with a unique identifier in the database but no specific UidKey mapping has been linked to the unique identifier. In this case, the user signature can be used to retrieve the data 1012. In some embodiments, data attributes may be retrieved through look up of stored data or real time computed data using a real-time inference model 1014. No data attribute is returned if neither the UidKey nor the signature is found in the database or by the real-time inference model. In some embodiments, the following logic may be used for retrieving data:

---
Retrieving User Segment:
  select where
    Dim(Attribute, attributeId)
  Query language:
    Operations AND/OR, Numeric value on (KeyId, optionalValue)
    adRequest(attributeKey, value) in Union AdQ(AttributeKey, value)
  {Unified Filtering, Targeting, and Re-targeting}
---

Once the data attributes are identified, the data attributes can be provided to the requester 1016.

Figure 11:
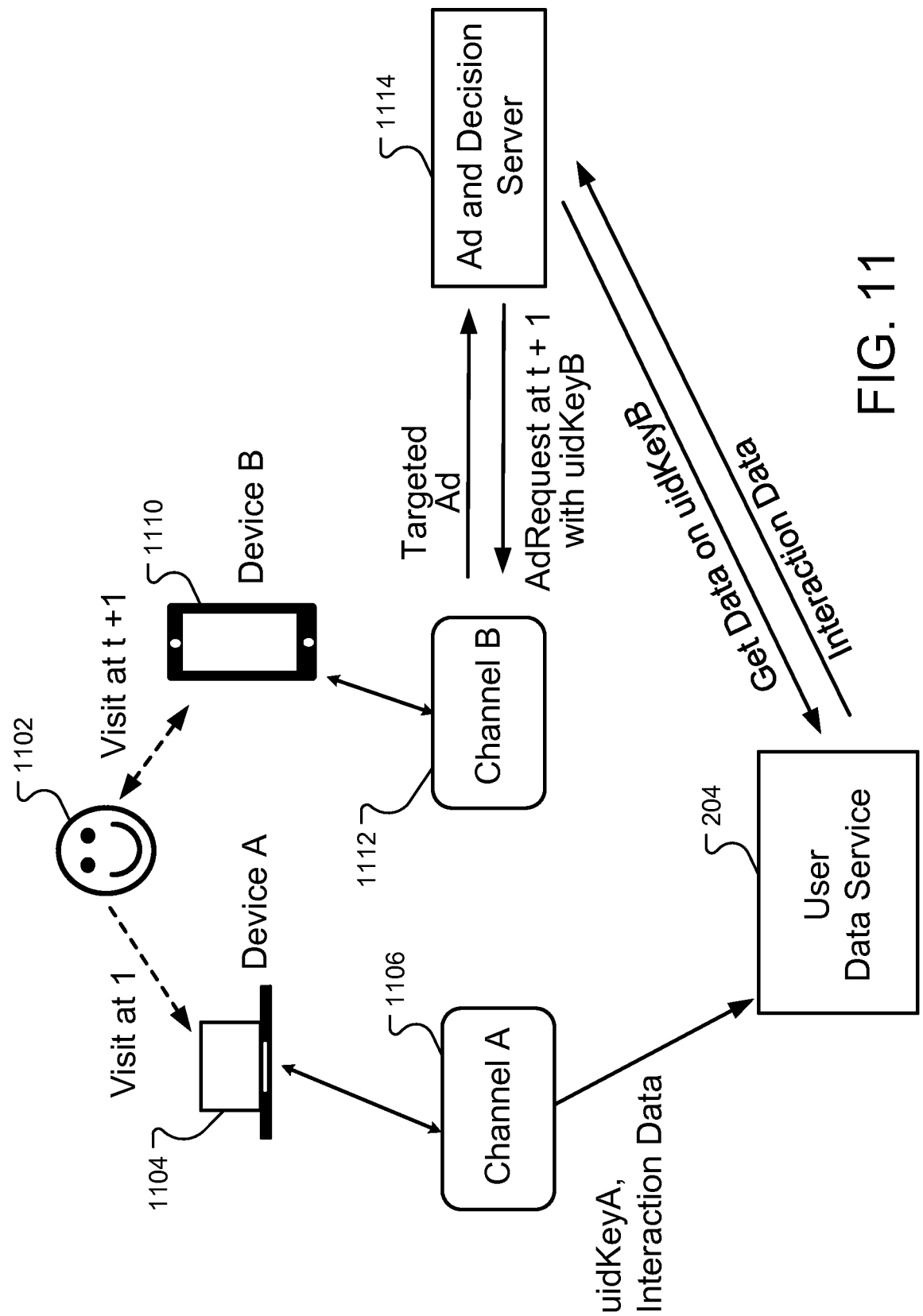
FIG. 11 illustrates an example of a method for targeting.

Referring to FIG. 11, a diagram of an example of a method for targeting is shown. In some embodiments, basic whitelisting, blacklisting, targeting and re-targeting may follow the same process or similar process. For example, whitelisting, blacklisting, targeting and retargeting may include different data acquisition methods, which may be transparent to the user of the data. The basic pattern of blacklisting, white listing, targeting may involve specifying in target engine rules involving filtering users on one or more data items on data sets involving UidKey, dataAttributes, and (dataAttribute, Score) pairs associated with the user. In some embodiments, complex rules can be specified using the query language. For example, device targeting can be carried out on simple UidKeys being IDFAs or device.model, and simple demographic targeting on age and education involves checking users with given demo.age anddemo.edu attributes. These attribute can be further combined with location and any other attributes. The target engine rules may be stored, for example, in a rule store.

In some embodiments, targeting can also involve inferred attributes such as on propensity of clicks, conversion, or any user defined attributes. For example, data attributes (adId.conv, score) can be used to target users whose likelihood of conversion on advertise adId, which can be a campaign identifiers, creative identifier, or a product id whose data are tracked and used to model and compute the scores.

In some embodiments, re-targeting involves targeting the same user across media channels on the same or different devices. For example, and still referring to FIG. 10, a user 1102 is first seen on Media Channel A 1106 (Site or App) with device A 1104 and then subsequently visits Media Channel B 1112 with device B 1110. When the user first visits Media Channel A 1106, the visit event is sent to the User data service 1108, which uses the same data processing format to extract the event data attributes and the UidKey A and attach it to the user identifier. When the user subsequently visits Media Channel B 1112 using device B 1110, the UidKey B is used to engage with the user on Site 'B'. Using the UidKey B, the data is retrieved and proper ad display decisions are made, by an Ad and Decision Server 1114, using the signal.

Previous method of retargeting often involves heuristics that involve one type of site and a single user identifier such as cookie. The userId association allows targeting and retargeting on any number of devices and channels on any attributes. Furthermore, targeting and retargeting can be more effective and automated by building a basing on user scores as described in the following:

a. For a given ad or ad group, choose performance metric.
  b. Run campaigns for a proper period of time (such as 6 hours, depending partly on sparsity of tracked events), and track performance events.

c. Build model 912 to predict the events using user and other realtime accessible attributes as predictors.
d. Target a user if the probability of predicted events is above a given threshold. The threshold can be picked by examining the lift curve and the desired number of users to reach. The performance will be defined by the cut off threshold.
e. In particular, if only retargeting variable is used in building the model (such as one only retargeting attribute is available to certain users), the predicted score is used to define to re-target or not to re-target a user.

Thus, targeting and retargeting can be done on a previous unknown parameters, and result predictable.

A publisher goal is often to define a set of users as a package, and sell to a given brands. The user data can be used to automate and quantify the process.
a. For a given set of brands, track performance on campaigns associated with the brands.
b. Build model (for example, the model 912 of FIG. 9) for to predict the performance metrics.
c. Score rest of the users based on the performance metrics to produce [userId, Brand Performance Score].
d. Rank all based on the performance score.

An audience can thus be packaged based on the performance scores, and priced accordingly.

Since the same data and taxonomy definition models are used for all types of data, cross device and cross channel re-targeting maybe specified in the same way as targeting syntactically and in processing. For example, in some embodiments, home IP as UidKey or in combination with user agent can be used to retargeting users across laptops and smartphones. More complex cases involves UidKey and userIdentifier linkage. A user who visited site 'A' through laptop identified by a cookie or home IP and can be targeted through a device Id (for example, IDFA) in a different location on mobile App. In some embodiments, re-targeting can be made more rigorous by building modeling the user on propensity of actions. For example, user visit data on Site 'A' may be used as part of the signals of conversion, and along with other user data and attributes, this information can be used to model the propensity of actions of interest. The user is then re-targeted if the score is above a certain threshold (defined by the lift) thus resulting in measurable improvement in re-targeting lift and potentially larger number of users being qualified for re-targeting by using signatures beyond the re-targeting UidKeys.

Figure 12:
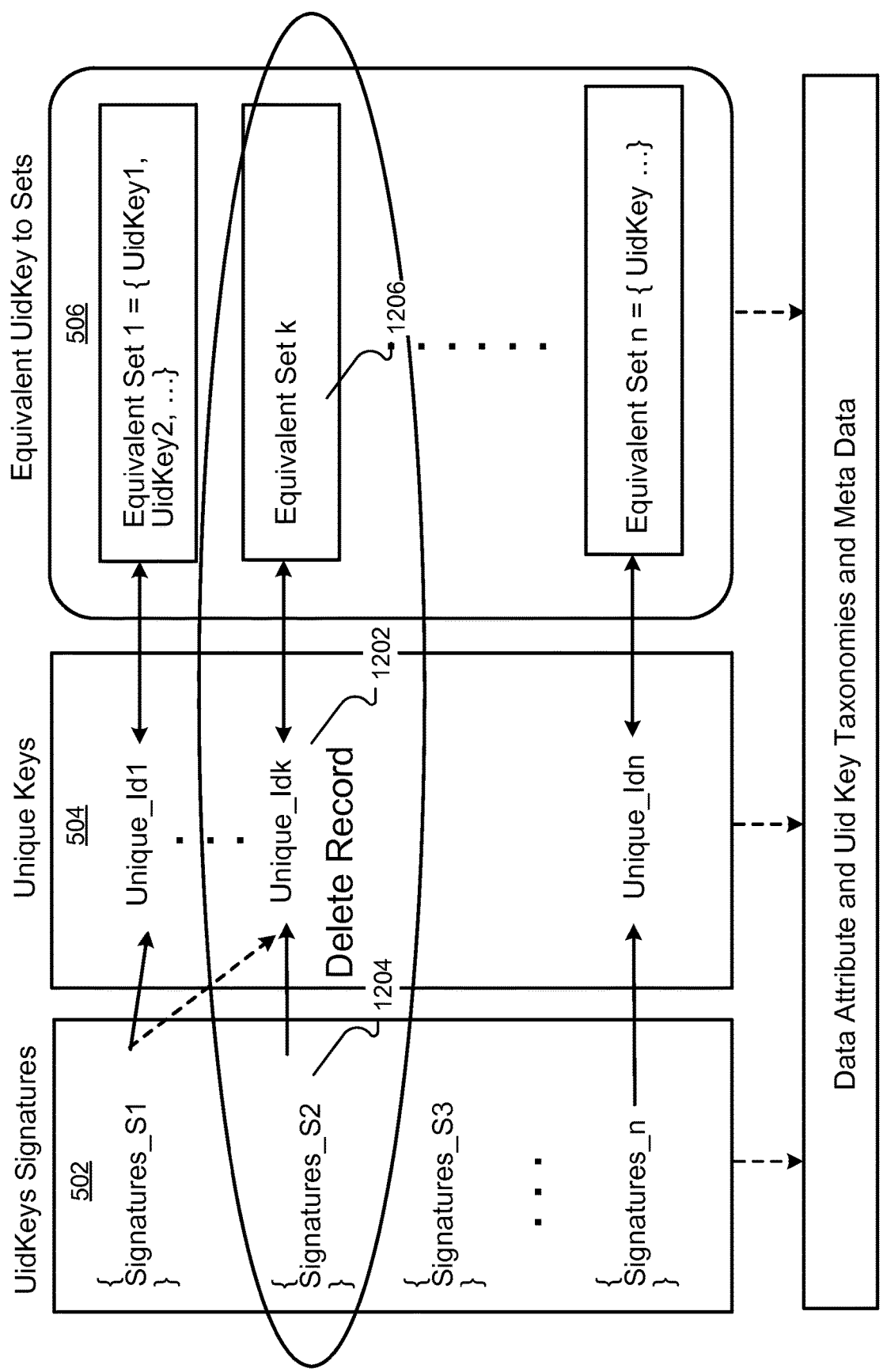
FIG. 12 illustrates an example of removing identifiers.

FIG. 12 illustrates an example of removing identifiers. In some embodiments, different privacy policies can be supported for storing user record. For Example, an opt out option from a particular device or media channel may correspond to the deletion of the corresponding UidKey 1202 and associated data (including UidKey Signatures 1204 and Equivalent Sets 1206). And opt out from all devices can be implemented as deletion of the UidKey, the unique identifier, and all the UidKeys and data associated with the Uid.

Figure 13A:
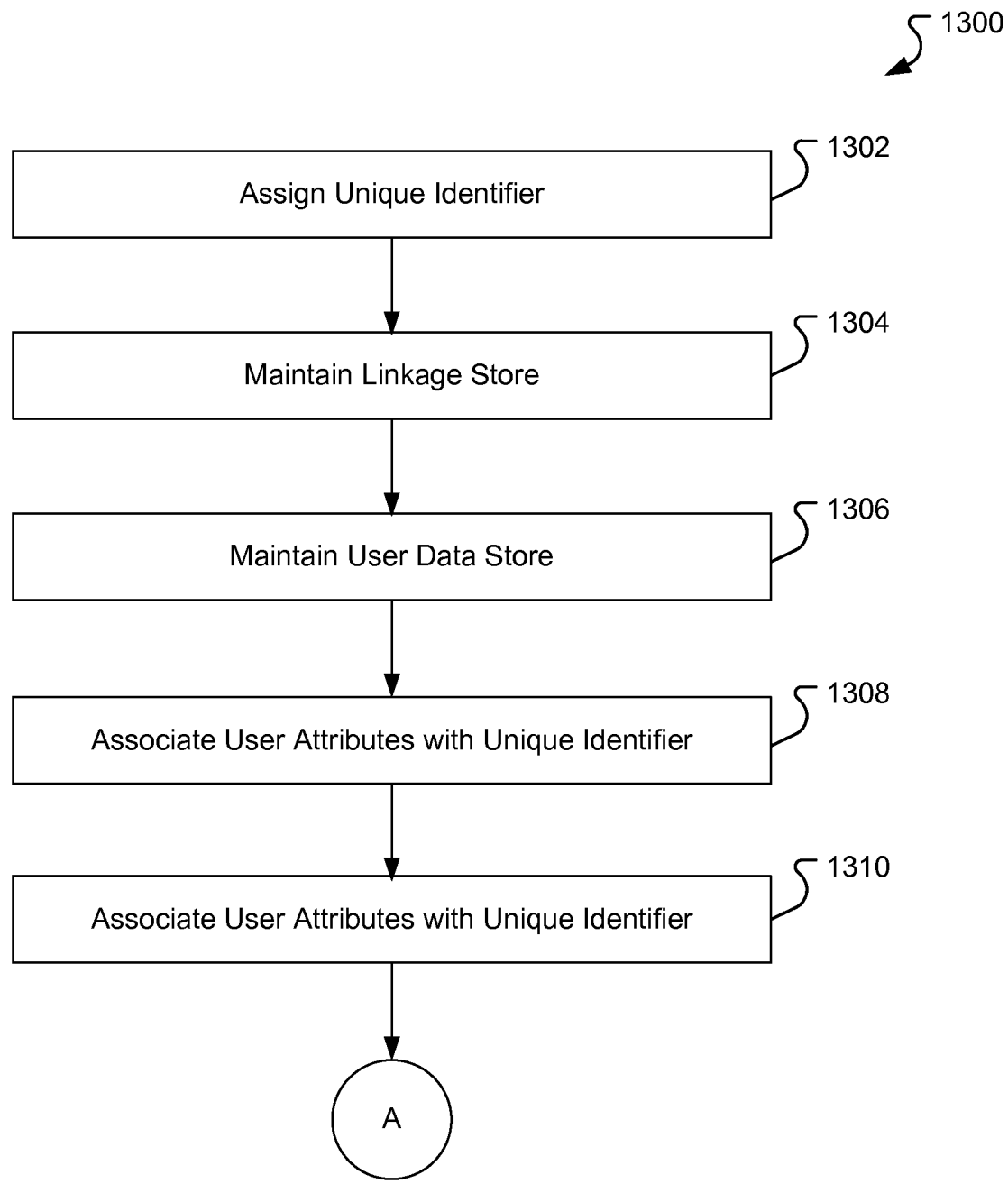
FIGS. 13A-B are a flow chart of an example of a process for identifying users and providing user data.
Figure 13B:
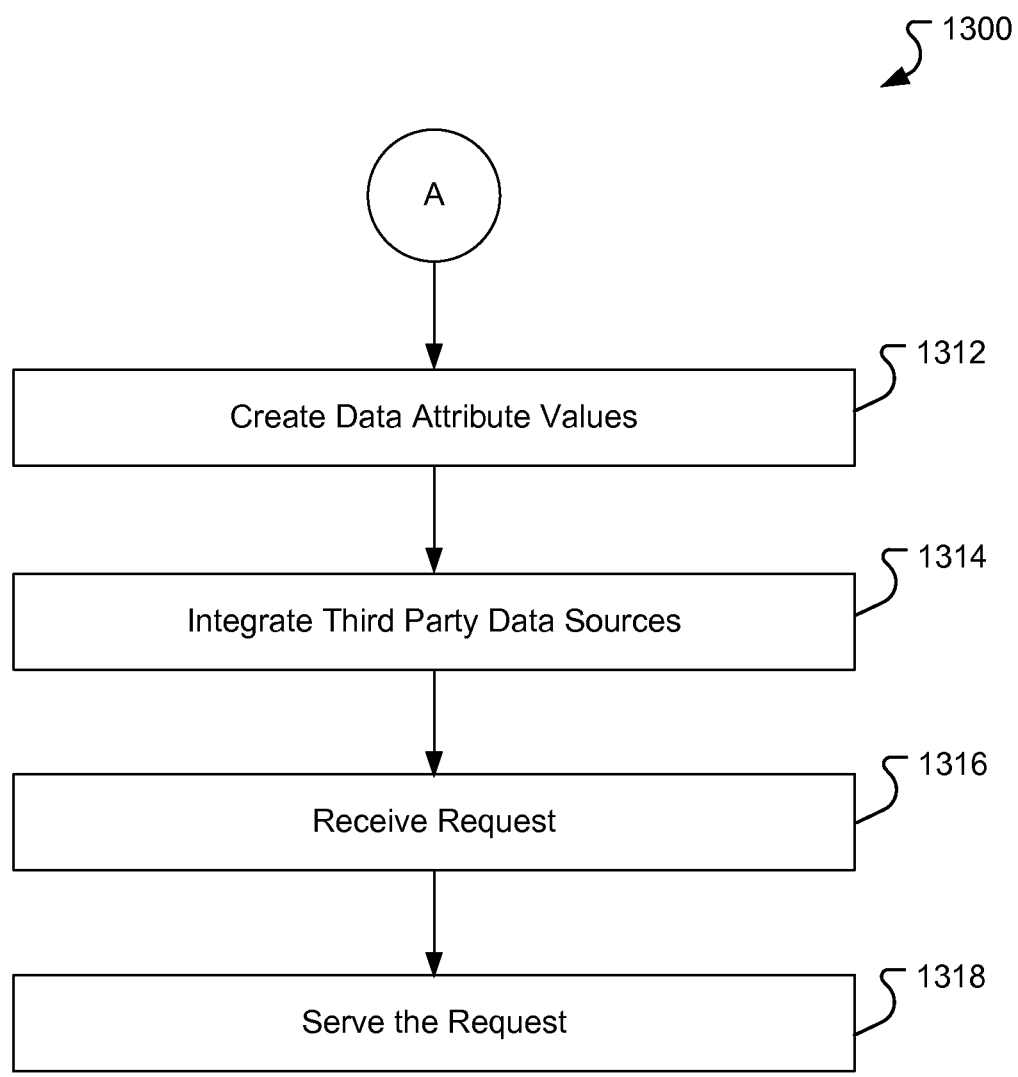

FIGS. 13A-B are a flow chart of an example of a process 1300 for identifying users and providing user data. The process 1300 assigns 1302 to each user or user segment a unique identifier that is not device, network, media, and location dependent.

The process 1300 maintains 1304 a linkage store (for example, as described above with respect to FIGS. 5A and 5B) by establishing and storing linkage between user identifier keys or key signatures (called Uidkeys) that are device, network, media, or location dependent with the said user identifiers. The UidKey may include deviceIds, encoded deviceIds, Cookies, device identifier or equivalence such as IDFA and UDID for iOS devices, androidId, IP addresses with or without qualifiers, location identifiers of various granularity such as zip code, street segment, latitude and longitude pairs, media identifiers, media category identifiers, device clock skew, device clock offset, device connection and response time. The user identifiers may be updated and merged periodically or continuously.

The user data may be provided in batches. The user data may be provided by sources such as through ftp, streaming, messaging, or real-time web service call from a server, or media content crawling agent, programs executed on devices such as SDK embedded in an mobile app, Web tag from web pages, JavaScripts, etc. for user interaction tracking, Web pixels for retargeting, and third party data provider.

The process 1300 maintains 1306 a user data store for user data attributes in association with the UidKeys or the user identifiers. The user data attributes may include different kinds of user information. For example, the user data attributes may include a summary of historical media interaction including as app usage scores (including measures of frequencies of use and how recently the use occurred) for apps and/or app categories.

The user data attributes may include user interests channel category usage scores (including measures of frequencies of use and how recently the use occurred). The user data media content classification can be organized using the IAB classification and/or alternative classification schemes.

The user data attributes may include product purchase history (for example, from e-commerce and brick and mortar stores, or offline, purchase data).

The user data attributes may also include demographic data (for example, education level, income information, etc.).

The user data attributes may include advertising interactions and interest scores in media or products. For example, the user data attributes may include social interaction data. The social interaction social interaction data may include content id or categories of content followed, users followed, users linked to, etc.

The user data attributes may also include location data. For example, the location data may indicate physical locations with different levels of granularity (such as address (country, state, city, street number), zip code, latitude and longitude, a GIS centroid of polygon, and/or polygon).

In some implementations, the user data attribute may be custom defined with mapping to the taxonomy. Mapping rules and classification can enable the mapping between different taxonomies.

The user data attribute can be observed attributes or inferred attributes. The observed attribute creation process and algorithm may comprise of crawling content data from Internet, fetching content and product catalogs, aggregating log data behavior tracking or advertising request servers, and merging with third party data.

The inferred attribute creation may include, in addition to the observed data processing, building classification and regression models for inferred attributes.

The process 1300 associates 1308 each said user data attributes with a unique attribute identifier, which is in turn associated with a taxonomy defining attribute properties.

The process 1300 receives 1310 from data containing device, network, media, or location dependent keys, key signatures, and options data attributes.

Referring to FIG. 13B, the process 1300 creates 1312 data attribute values related to the attribute keys by running an attribute value creation processing and algorithms involving data from a heterogeneous types and sources.

The process 1300 integrates 1314 with third party data source by joining or linking one or more userid key with data identifiers of the same type of third party sources.

The process 1300 receives 1316 request from data usage source parameters containing device, network, media, or location dependent keys or key signatures, and data attributes.

The process 1300 serves 1318 the request by looking up from the identifier and data stores using the UidKeys and optional data attribute specification. Serving the request may include measuring the user using a set of metrics comprising propensity, life time value, likelihood of response for all or subset of media channels, devices, networks, location, and other and user interaction sources, and using the metrics to help manage the user data and serving user based on such rankings accordingly.

User data sources can be scored and ranked. Attributes from one data source may be compared to attributes from another data source. Including a comparison of relevance, importance, etc. for all or subset of media channels, devices, networks, location, and other and user interaction sources, and using the metrics to help manage the user data and serving user based on such rankings accordingly. Using inferred data for targeting and re-targeting may include associating a targeting data attributes with a ranking score, and a control parameter for finding the trade-off between targeting accuracy and number of requests covered.

Figure 14:
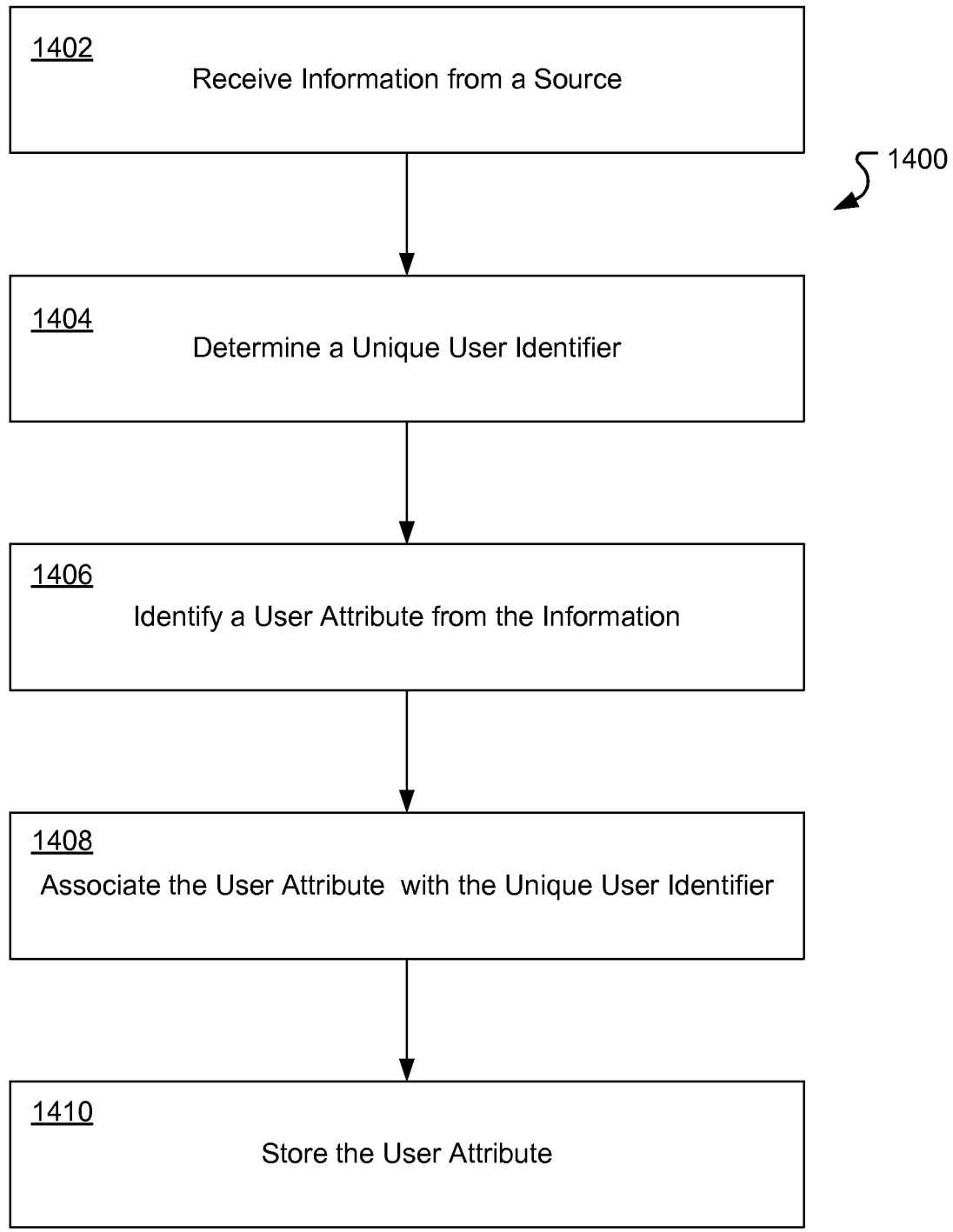
FIG. 14 is a flowchart of an example process for capturing user attributes from disparate data sources.

FIG. 14 is a flowchart of an example of a process 1400 for capturing user attributes from disparate data sources. The process may be performed by a computer system including one or more computers and one or more storage devices storing instructions that are operable, when executed by the one or more computers, to cause the one or more computers to perform operations included in the process.

The process 1400 receives 1402 information from a source. In this example, the information is associated with a device identifier. The device identifier may be, for example, a UidKey. In some implementations, the information can be associated with a digital signature, as described above. The digital signature can be, for example, a UidKey Signature.

The process 1400 determines 1404 a unique user identifier. The unique user identifier can be determined based on the device identifier (or digital signature). The unique user identifier may be the unique keys as described above.

The process 1400 identifies 1406 a user attribute from the information. The user attribute may be provided directly in the information or the user attribute may be inferred from the information either alone or together with other information about the user.

The process 1400 associated 1408 the user attribute with the unique user identifier.

The process 1410 stores 1410 the user attribute in a repository. The repository may be, for example, a database, such as the data store 418 of FIG. 4. The repository user attributes associated with the unique user identifier, the other stored user attributes having been received from a plurality of different sources.

Figure 15:
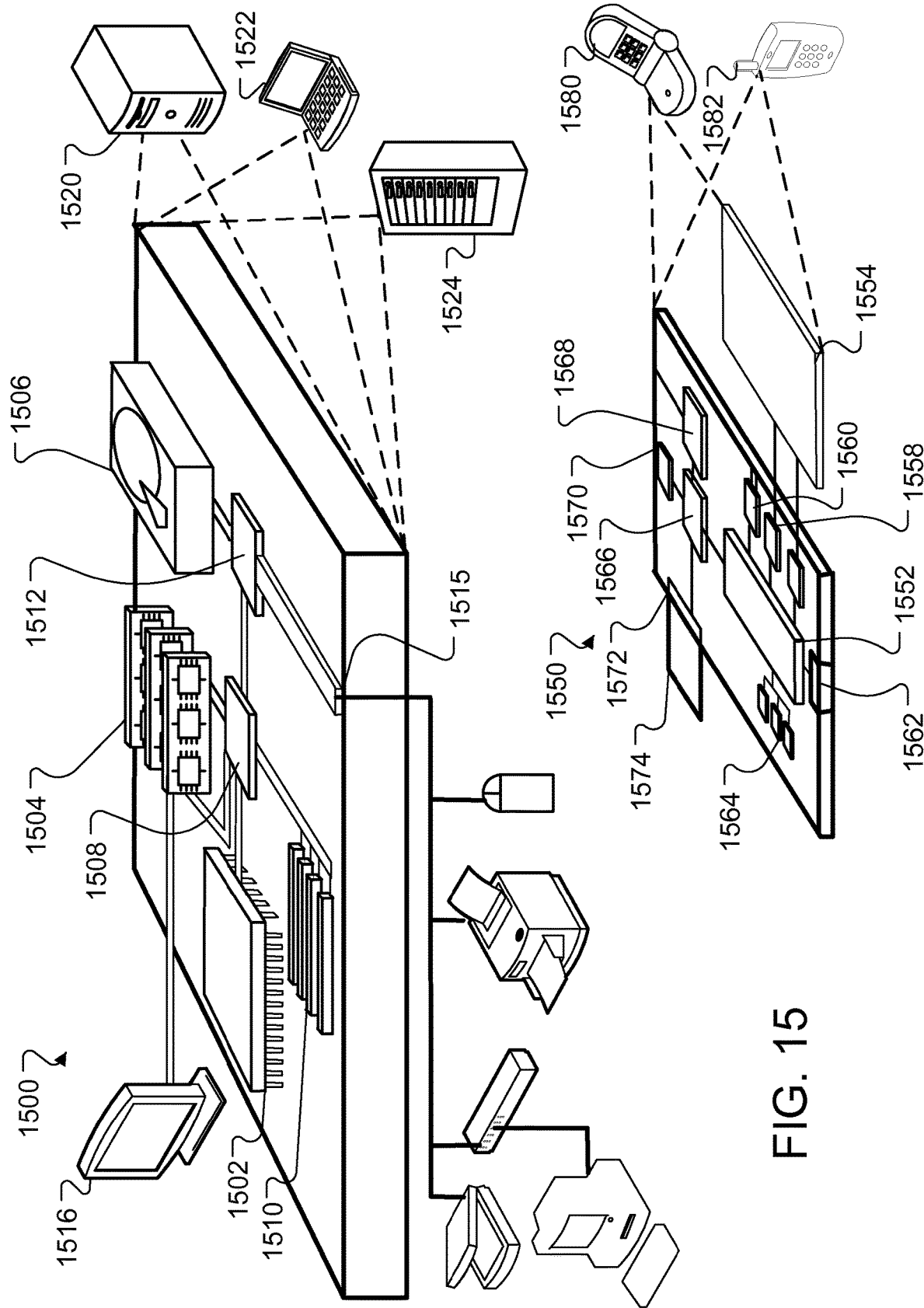
FIG. 15 illustrates an example of a computing device.

FIG. 15 shows an example of example computer device 1500 and example mobile computer device 1550, which can be used to implement the techniques described herein. For example, a portion or all of the operations described above may be executed by the computer device 1500 and/or the mobile computer device 1550. Computing device 1500 is intended to represent various forms of digital computers, including, e.g., laptops, desktops, workstations, personal digital assistants, servers, blade servers, mainframes, and other appropriate computers. Computing device 1550 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1500 includes processor 1502, memory 1504, storage device 1506, high-speed interface 1508 connecting to memory 1504 and high-speed expansion ports 1510, and low speed interface 1512 connecting to low speed bus 1514 and storage device 1506. Each of components 1502, 1504, 1506, 1508, 1510, and 1512, are interconnected using various busses, and can be mounted on a common motherboard or in other manners as appropriate. Processor 1502 can process instructions for execution within computing device 1500, including instructions stored in memory 1504 or on storage device 1506 to display graphical data for a GUI on an external input/output device, including, e.g., display 1516 coupled to high speed interface 1508. In other implementations, multiple processors and/or multiple busses can be used, as appropriate, along with multiple memories and types of memory. Also, multiple computing devices 1500 can be connected, with each device providing portions of the necessary operations (e.g., as a server bank, a group of blade servers, or a multi-processor system).

Memory 1504 stores data within computing device 1500. In one implementation, memory 1504 is a volatile memory unit or units. In another implementation, memory 1504 is a non-volatile memory unit or units. Memory 1504 also can be another form of computer-readable medium (e.g., a magnetic or optical disk. Memory 1504 may be non-transitory.)

Storage device 1506 is capable of providing mass storage for computing device 1300. In one implementation, storage device 1506 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1504, storage device 1506, memory on processor 1502, and the like.)

High-speed controller 1508 manages bandwidth-intensive operations for computing device 1300, while low speed controller 1512 manages lower bandwidth-intensive operations. Such allocation of functions is an example only. In one implementation, high-speed controller 1308 is coupled to memory 1504, display 1516 (e.g., through a graphics processor or accelerator), and to high-speed expansion ports 1510, which can accept various expansion cards (not shown). In the implementation, low-speed controller 1512 is coupled to storage device 1506 and low-speed expansion port 1514. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1500 can be implemented in a number of different forms, as shown in the figure. For example, it can be implemented as standard server 1520, or multiple times in a group of such servers. It also can be implemented as part of rack server system 1524. In addition or as an alternative, it can be implemented in a personal computer (e.g., laptop computer 1522.) In some examples, components from computing device 1500 can be combined with other components in a mobile device (not shown), e.g., device 1550. Each of such devices can contain one or more of computing device 1500, 1550, and an entire system can be made up of multiple computing devices 1500, 1550 communicating with each other.

Computing device 1550 includes processor 1552, memory 1564, an input/output device (e.g., display 1554, communication interface 1566, and transceiver 1568) among other components. Device 1550 also can be provided with a storage device, (e.g., a microdrive or other device) to provide additional storage. Each of components 1550, 1552, 1564, 1554, 1566, and 1568, are interconnected using various buses, and several of the components can be mounted on a common motherboard or in other manners as appropriate.

Processor 1552 can execute instructions within computing device 1550, including instructions stored in memory 1564. The processor can be implemented as a chipset of chips that include separate and multiple analog and digital processors. The processor can provide, for example, for coordination of the other components of device 1550, e.g., control of user interfaces, applications run by device 1550, and wireless communication by device 1550.

Processor 1552 can communicate with a user through control interface 1558 and display interface 1556 coupled to display 1554. Display 1554 can be, for example, a TFT LCD (Thin-Film-Transistor Liquid Crystal Display) or an OLED (Organic Light Emitting Diode) display, or other appropriate display technology. Display interface 1556 can comprise appropriate circuitry for driving display 1554 to present graphical and other data to a user. Control interface 1558 can receive commands from a user and convert them for submission to processor 1552. In addition, external interface 1562 can communicate with processor 1542, so as to enable near area communication of device 1550 with other devices. External interface 1562 can provide, for example, for wired communication in some implementations, or for wireless communication in other implementations, and multiple interfaces also can be used.

Memory 1564 stores data within computing device 1550. Memory 1564 can be implemented as one or more of a computer-readable medium or media, a volatile memory unit or units, or a non-volatile memory unit or units. Expansion memory 1574 also can be provided and connected to device 1550 through expansion interface 1572, which can include, for example, a SIMM (Single In Line Memory Module) card interface. Such expansion memory 1574 can provide extra storage space for device 1550, or also can store applications or other data for device 1550. Specifically, expansion memory 1574 can include instructions to carry out or supplement the processes described above, and can include secure data also. Thus, for example, expansion memory 1574 can be provided as a security module for device 1550, and can be programmed with instructions that permit secure use of device 1550. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1564, expansion memory 1574, and/or memory on processor 1552), which can be received, for example, over transceiver 1568 or external interface 1562.

Device 1550 can communicate wirelessly through communication interface 1566, which can include digital signal processing circuitry where necessary. Communication interface 1566 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1568. In addition, short-range communication can occur, e.g., using a Bluetooth®, WiFi, or other such transceiver (not shown). In addition, GPS (Global Positioning System) receiver module 1570 can provide additional navigation- and location-related wireless data to device 1550, which can be used as appropriate by applications running on device 1550. Sensors and modules such as cameras, microphones, compasses, accelerators (for orientation sensing), etc. may be included in the device.

Device 1550 also can communicate audibly using audio codec 1560, which can receive spoken data from a user and convert it to usable digital data. Audio codec 1560 can likewise generate audible sound for a user, (e.g., through a speaker in a handset of device 1550.) Such sound can include sound from voice telephone calls, can include recorded sound (e.g., voice messages, music files, and the like) and also can include sound generated by applications operating on device 1550.

Computing device 1550 can be implemented in a number of different forms, as shown in the figure. For example, it can be implemented as cellular telephone 1580. It also can be implemented as part of smartphone 1582, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
    receiving information from a source, the information associated with a device identifier, wherein the source corresponds to a networked device;
    determining, based on the device identifier, a unique user identifier, wherein the unique user identifier identifies a user independent of network, media, and location;
    identifying at least one user attribute based on the received information;
    associating the user attribute with the unique user identifier;
    storing the user attribute in a repository, wherein the repository stores a plurality of other user attributes associated with the unique user identifier, the other stored user attributes being received from a plurality of different sources, wherein the plurality of different sources correspond to a plurality of different devices;
    scoring the user based on a model, wherein the model is an inference model computed using a learning algorithm, wherein the model is based on an inferred user attribute, wherein the inferred user attribute comprises a prediction attribute that comprises a propensity of a user performing a user action indicating interest for an event, and wherein the propensity comprises a likelihood of the user performing the user action in response to being presented with a particular advertisement, wherein the propensity is based on the user attributes from multiple different sources stored in the repository, and wherein the inference model is used to create inferred attributes for users without such attributes; and
    targeting the user at one or more of the different devices based on the scoring.

2. The computer-implemented method of claim 1, further comprising linking the unique user identifier with a plurality of signatures, each signature specific to a device or media channel.

3. The computer-implemented method of claim 2, wherein the signatures are selected from the group consisting of IP addresses, location identifiers, zip code, street segment, latitude and longitude pairs, media identifiers, media category identifiers, device clock skew, device clock offset, device connection and response time.

4. The computer-implemented method of claim 1, wherein storing the user attribute comprises:
    obtaining a plurality of device identifiers corresponding to the plurality of different devices, wherein the plurality of device identifiers are associated with the unique user identifier;
    generating a hash value based on the plurality of device identifiers;
    merging the user attribute with the other stored user attributes received from the plurality of different devices;
    storing the merged user attribute and other stored user attributes in a location identified by the hash value; and
    deleting the plurality of device identifiers.

5. The computer-implemented method of claim 1, further comprising:
    determining that a device identifier contains user identifiable information; and
    generating an anonymous device identifier using a one-way hash of the device identifier.

6. The computer-implemented method of claim 1, wherein the user attribute includes at least one of usage scores, purchase history, education level, income, interest scores, advertising interactions, and social interaction data.

7. The computer-implemented method of claim 1, wherein the source is selected from the group consisting of a mobile phone, a tablet computing device, a personal computer, a connected TV, and an internet protocol television.

8. The computer-implemented method of claim 1, further comprising:
    receiving additional information about the user from a plurality of sources, each source associated with a device identifier; and
    associating each of the device identifiers with the unique user identifier.

9. The computer-implemented method of claim 1, further comprising:
    receiving a request for user attributes, the request including a device identifier;
    identifying a unique user identifier based on the device identifier; and
    providing user data associated with the unique user identifier.

10. The computer-implemented method of claim 1, further comprising:
    receiving a request for user attributes, the request including a signature;

identifying a unique user identifier based on the signature; and providing user attributes associated with the unique user identifier.

11. The computer-implemented method of claim 1, wherein the information from different devices is used for real-time use and offline analytical processing.

12. The computer-implemented method of claim 1, further comprising:
targeting a group of users across different device identifiers and media channels comprising:
receiving request that contains a linked device id or user signature
receiving a rule involving targeted user attributes;
retrieving the stored user attributes using a user device id or a user signature; and
identifying the targeted user by applying the rule to the user attributes.

13. The computer-implemented method of claim 12, further comprising identifying a plurality of sets of users, each set of users targeted toward different advertiser groups.

14. The computer implementation method of claim 1, further comprising generating a score for the user based on the user attributes of the user.

15. The computer-implemented method of claim 14, wherein the targeting comprises targeting the user from the same device or retargeting the user from a different device based on the score.

16. The computer-implemented method of claim 14, further comprising grouping the user with other users for a type of advertiser based on the score.

17. The computer-implemented method of claim 1, wherein:
the user action comprises at least one of a click and a conversion; and
the event comprises a data attribute of an advertisement.

18. The computer-implemented method of claim 1, wherein:
the user attributes from multiple different sources in the repository comprise:
a signal of conversion based on actions on a first device of the plurality of different devices; and
other stored user attributes from one or more second devices of the plurality of devices, wherein the first device is different from the one or more second devices; and
the scoring is based on a combination of the signal of conversion and the other stored user attributes.

19. The computer-implemented method of claim 1, wherein:
the inferred user attribute is from a user data set;
the user data set is split into a training set and a test set;
the training set is us used to output a ranking function;
the ranking function is used with the test set to generate a lift curve on the prediction attribute;
for a second user without the inferred user attribute, the inference model is used to generate a ranking score, wherein the lift curve creates an indicator whether the inferred user attribute should be used based on a pre-specified accuracy.

20. A non-transitory computer storage medium encoded with computer program instructions that when executed by one or more computers cause the one or more computers to perform operations comprising:
receiving information from a source, the information associated with a device identifier, and wherein the source corresponds to a networked device;
determining, based on the device identifier, a unique user identifier, wherein the unique user identifier identifies a user independent of network, media, and location;
identifying at least one user attribute based on the received information;
associating the user attribute with the unique user identifier;
storing the user attribute in a repository, wherein the repository stores a plurality of other user attributes associated with the unique user identifier, the other stored user attributes being received from a plurality of different sources, wherein the plurality of different sources correspond to a plurality of different devices;
scoring the user based on a model, wherein the model is an inference model computed using a learning algorithm, wherein the model is based on an inferred user attribute, wherein the inferred user attribute comprises a prediction attribute that comprises a propensity of a user performing a user action indicating interest for an event, wherein the propensity comprises a likelihood of the user performing the user action in response to being presented with a particular advertisement, and wherein the propensity is based on the user attributes from multiple different sources stored in the repository, and wherein the inference model is used to create inferred attributes for users without such attributes; and
targeting the user at one or more of the different devices based on the scoring.

21. The non-transitory computer storage medium of claim 20, wherein the operations further comprise linking the unique user identifier with a plurality of signatures, each signature specific to a device or media channel.

22. The non-transitory computer storage medium of claim 21, wherein the signatures are selected from the group consisting of IP addresses, location identifiers, zip code, street segment, latitude and longitude pairs, media identifiers, media category identifiers, device clock skew, device clock offset, device connection and response time.

23. The non-transitory computer storage medium of claim 20, wherein storing the user attribute comprises:
obtaining a plurality of device identifiers corresponding to the plurality of different devices, wherein the plurality of device identifiers are associated with the unique user identifier;
generating a hash value based on the plurality of device identifiers;
merging the user attribute with the other stored user attributes received from the plurality of different devices;
storing the merged user attribute and other stored user attributes in a location identified by the hash value; and
deleting the plurality of device identifiers.

24. The non-transitory computer storage medium of claim 20, wherein the operations further comprise:
determining that a device identifier contains user identifiable information; and
generating an anonymous device identifier using a one-way hash of the device identifier.

25. The non-transitory computer storage medium of claim 20, wherein the user attribute includes at least one of usage scores, purchase history, education level, income, interest scores, advertising interactions, and social interaction data.

26. The non-transitory computer storage medium of claim 20, wherein the source is selected from the group consisting of a mobile phone, a tablet computing device, a personal computer, a connected TV, and an internet protocol television.

27. The non-transitory computer storage medium of claim 20, wherein the operations further comprise:
receiving additional information about the user from a plurality of sources, each source associated with a device identifier; and
associating each of the device identifiers with the unique user identifier.

28. The non-transitory computer storage medium of claim 20, wherein the operations further comprise:
receiving a request for user attributes, the request including a device identifier;
identifying a unique user identifier based on the device identifier; and
providing user data associated with the unique user identifier.

29. The non-transitory computer storage medium of claim 20, wherein the operations further comprise:
receiving a request for user attributes, the request including a signature;
identifying a unique user identifier based on the signature; and
providing user attributes associated with the unique user identifier.

30. The non-transitory computer storage medium of claim 20, wherein the information from different devices is used for real-time use and offline analytical processing.

31. The non-transitory computer storage medium of claim 20, wherein the operations further comprise:
targeting a group of users across different device identifiers and media channels comprising:
receiving request that contains a linked device id or user signature
receiving a rule involving targeted user attributes;
retrieving the stored user attributes using a user device id or a user signature; and
identifying the targeted user by applying the rule to the user attributes.

32. The non-transitory computer storage medium of claim 31, wherein the operations further comprise identifying a plurality of sets of users, each set of users targeted toward different advertiser groups.

33. The non-transitory computer storage medium of claim 20, wherein the operations further comprise generating a score for the user based on the user attributes of the user.

34. The non-transitory computer storage medium of claim 33, wherein the operations targeting the user comprise targeting the user from the same device or retargeting the user from a different device based on the score.

35. The non-transitory computer storage medium of claim 33, wherein the operations further comprise grouping the user with other users for a type of advertiser based on the score.

36. The non-transitory computer storage medium of claim 20, wherein:
the inferred user attribute is from a user data set;
the user data set is split into a training set and a test set;
the training set is us used to output a ranking function;
the ranking function is used with the test set to generate a lift curve on the prediction attribute;
for a second user without the inferred user attribute, the inference model is used to generate a ranking score, wherein the lift curve creates an indicator whether the inferred user attribute should be used based on a pre-specified accuracy.

37. A system comprising:
one or more computers and one or more storage devices storing instructions that are operable, when executed by the one or more computers, to cause the one or more computers to perform operations comprising:
receiving information from a source, the information associated with a device identifier;
determining, based on the device identifier, a unique user identifier, wherein the unique user identifier identifies a user independent of network, media, and location;
identifying at least one user attribute based on the received information;
associating the user attribute with the unique user identifier;
storing the user attribute in a repository, wherein the repository stores a plurality of other user attributes associated with the unique user identifier, the other stored user attributes being received from a plurality of different sources, wherein the plurality of different sources correspond to a plurality of different devices;
scoring the user based on a model, wherein the model is based on an inferred user attribute, wherein the inferred user attribute comprises a propensity of a user performing a user action indicating interest for an event, and wherein the propensity is based on the user attributes from multiple different sources stored in the repository; and
targeting the user at one or more of the different devices based on the scoring.

38. The system of claim 37, further comprising linking the unique user identifier with a plurality of signatures, each signature specific to a device or media channel.

39. The system of claim 38, wherein the signatures are selected from the group consisting of IP addresses, location identifiers, zip code, street segment, latitude and longitude pairs, media identifiers, media category identifiers, device clock skew, device clock offset, device connection and response time.

40. The system of claim 37, wherein storing the user attribute comprises:
obtaining a plurality of device identifiers corresponding to the plurality of different devices, wherein the plurality of device identifiers are associated with the unique user identifier;
generating a hash value based on the plurality of device identifiers; and
merging the user attribute with the other stored user attributes received from the plurality of different devices;
storing the merged user attribute and other stored user attributes in a location identified by the hash value; and
deleting the plurality of device identifiers.

41. The system of claim 37, where the operations further comprise:
determining that a device identifier contains user identifiable information; and
generating an anonymous device identifier using a one-way hash of the device identifier.

42. The system of claim 37, wherein the user attribute includes at least one of usage scores, purchase history, education level, income, interest scores, advertising interactions, and social interaction data.

43. The system of claim 37, wherein the source is selected from the group consisting of a mobile phone, a tablet computing device, a personal computer, a connected TV, and an internet protocol television.

44. The system of claim 37, wherein the operations further comprise:

receiving additional information about the user from a plurality of sources, each source associated with a device identifier; and associating each of the device identifiers with the unique user identifier.

45. The system of claim 37, wherein the operations further comprise:

receiving a request for user attributes, the request including a device identifier;

identifying a unique user identifier based on the device identifier; and providing user data associated with the unique user identifier.

46. The system of claim 37, wherein the operations further comprise:

receiving a request for user attributes, the request including a signature;

identifying a unique user identifier based on the signature; and providing user attributes associated with the unique user identifier.

47. The system of claim 37, wherein the information from different devices is used for realtime use and offline analytical processing.

48. The system of claim 37, wherein the operations further comprise:

targeting a group of users across different device identifiers and media channels comprising:

receiving request that contains a linked device id or user signature receiving a rule involving targeted user attributes;

retrieving the stored user attributes using a user device id or a user signature; and identifying the targeted user by applying the rule to the user attributes.

49. The system of claim 48, wherein the operations further comprise identifying a plurality of sets of users, each set of users targeted toward different advertiser groups.

50. The system of claim 37, wherein the operations further comprise generating a score for the user based on the user attributes of the user.

51. The system of claim 50, wherein the operations targeting the user comprise targeting the user from the same device or retargeting the user from a different device based on the score.

52. The system of claim 50, wherein the operations further comprise grouping the user with other users for a type of advertiser based on the score.

53. The system of claim 37, wherein:

the inferred user attribute is from a user data set;

the user data set is split into a training set and a test set;

the training set is us used to output a ranking function;

the ranking function is used with the test set to generate a lift curve on the prediction attribute;

for a second user without the inferred user attribute, the inference model is used to generate a ranking score, wherein the lift curve creates an indicator whether the inferred user attribute should be used based on a pre-specified accuracy.

\* \* \* \* \*